United States Patent
Nonaka

(10) Patent No.: US 8,296,239 B2
(45) Date of Patent: Oct. 23, 2012

(54) DATA DISTRIBUTION SYSTEM AND METHOD OF SAME, DATA PROCESSING APPARATUS AND METHOD OF SAME, AND DATA RECORDING MEDIUM

(75) Inventor: Akira Nonaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1510 days.

(21) Appl. No.: 09/803,396

(22) Filed: Mar. 9, 2001

(65) Prior Publication Data

US 2002/0035492 A1 Mar. 21, 2002

(30) Foreign Application Priority Data

Mar. 10, 2000 (JP) ................................ 2000-072519

(51) Int. Cl.
*G06F 21/00* (2006.01)

(52) U.S. Cl. ................ 705/57; 705/51; 705/52; 726/26; 726/29

(58) Field of Classification Search .............. 705/51–53, 705/57; 380/200, 201; 709/231
See application file for complete search history.

(56) References Cited

U.S. PATENT DOCUMENTS

| | | | | |
|---|---|---|---|---|
| 4,740,890 A * | 4/1988 | William | ......................... | 705/52 |
| 5,247,575 A * | 9/1993 | Sprague et al. | ................. | 705/53 |
| 5,446,488 A * | 8/1995 | Vogel | ............................ | 725/151 |
| 5,513,260 A * | 4/1996 | Ryan | ............................. | 380/200 |
| 5,629,980 A * | 5/1997 | Stefik et al. | ..................... | 705/54 |
| 5,933,500 A * | 8/1999 | Blatter et al. | ................. | 380/200 |
| 6,453,356 B1 * | 9/2002 | Sheard et al. | ................. | 709/231 |
| 6,707,774 B1 * | 3/2004 | Kuroda et al. | ............. | 369/53.21 |
| 6,735,699 B1 * | 5/2004 | Sasaki et al. | .................... | 705/59 |
| 6,782,190 B1 * | 8/2004 | Morito | .......................... | 380/201 |
| 6,839,503 B1 * | 1/2005 | Hirai | ............................. | 380/201 |
| 6,847,950 B1 * | 1/2005 | Kamibayashi et al. | ........ | 705/57 |
| 6,859,789 B1 * | 2/2005 | Hayashi et al. | ................ | 705/57 |
| 6,865,552 B1 * | 3/2005 | Inoue et al. | ..................... | 705/57 |
| 6,868,494 B1 * | 3/2005 | Shitara et al. | ................... | 705/51 |

FOREIGN PATENT DOCUMENTS

| | | |
|---|---|---|
| JP | 6-195938 | 7/1994 |
| JP | 9-312039 | 12/1997 |
| JP | 10-177767 | 6/1998 |
| JP | 10-269289 | 10/1998 |

(Continued)

OTHER PUBLICATIONS

Japanese Office Action in corresponding Japanese Application No. 2000-072519 dated Apr. 7, 2009.

*Primary Examiner* — Jamie Kucab
(74) *Attorney, Agent, or Firm* — Finnegan, Henderson, Farabow, Garrett & Dunner, L.L.P.

(57) ABSTRACT

A data distribution system and method suitably performing various processing such as suitable distribution of data, control of copying, conversion of signals, charging, and distribution of profits, comprising a reproducing apparatus for reproducing content data to be distributed from a mounted recording medium, a recording apparatus for recording reproduced content data on a mounted recording medium, an examining means for examining types of content data recorded on the recording medium, the recording medium mounted in the reproducing apparatus, the reproducing apparatus, a recording medium mounted in the recording apparatus and the recording apparatus, and a controlling means for controlling a transfer of the content data from the recording medium mounted in the reproducing apparatus to the recording medium mounted in the recording apparatus based on results of the examination.

21 Claims, 37 Drawing Sheets

FOREIGN PATENT DOCUMENTS

| | | |
|---|---|---|
| JP | 11-66732 | 3/1999 |
| JP | 11-86453 | 3/1999 |
| JP | 11-150517 | 6/1999 |
| JP | 11-353796 | 12/1999 |
| JP | 2000-23089 | 1/2000 |
| JP | 2000-48478 | 2/2000 |

* cited by examiner

FIG.6

USAGE CONTROL POLICY(UCP)

| VERSION(VERSION NO.) |
|---|
| CONTENT ID FOR MANAGING ASSET MANAGEMENT AT CONTENT PROVIDER |
| SIGNATURE(CONTENT PROVIDER SECRET KEY) |
| GLOBAL UNIQUE CONTENT ID FOR MANAGEMENT OF THIRD PARTY RELIABLE ORGANIZATIONS |
| SIGNATURE(SECRET KEY OF THIRD PARTY RELIABLE ORGANIZATIONS) |
| COUNTRY, AREA CODE |
| CONTENT PROVIDER INFORMATION |
| AUTHORING DATE |
| ISSUER INFORMATION:THIRD PARTY RELIABLE ORGANIZATION INFORMATION |
| ISSUE DATE |
| EXPIRATION DATE(VALIDITY) |
| COMMUNICATION ADDRESS OF THIRD PARTY RELIABLE ORGANIZATION |
| DISTRIBUTION SERVICE PROVIDER INFORMATION |
| TYPE INFORMATION OF CONTENT① MOVIE/MUSIC/PROGRAM/CM/PR MATERIAL |
| TYPE INFORMATION OF CONTENT② ORIGINAL/SECONDARY USAGE/EDITED WORK |
| TYPE INFORMATION OF EXPRESSION OF CONTENT① MOVING PICTURE IMAGE, STATIC IMAGE, AUDIO, ETC. |
| TYPE INFORMATION OF EXPRESSION OF CONTENT② SIGNAL PARAMETERS, COMPRESSION METHOD |
| HANDLING AND CONTROL INFORMATION FROM USAGE SPACE EXAMINATION |
| ACCESS CONTROL INFORMATION FROM CONTENT PROVIDER |
| ACCESS CONTROL INFORMATION FROM USER(INITIAL VALUE) |
| HANDLING POLICY CONCERNING MILEAGE AND DISCOUNT COUPON |
| RECOMMEND SETTLEMENT MEANS:THIRD PARTY RELIABLE ORGANIZATION/ELECTRONIC MONEY SETTLEMENT |
| HANDLING AND CONTROL INFORMATION FOR LISTENING TO DEMO SAMPLE (SEMI-PUBLIC PARAMETERS) |
| SALE MANAGER OF CONTENT(PRODUCT)/SALE COUNTRY, AREA CODE |
| USAGE CONTROL<br>PRICE IN EACH TYPE OF PURCHASE IS WHOLESALE PRICE<br>PROMOTION USE FREE SERVICE PERIOD/NUMBER OF TIMES<br>RE-DISTRIBUTION<br>REPRODUCTION CHARGE PAY-PER-USE    UPPER LIMIT OF COPIES (-->SELL THROUGH)<br>PRICE OF ONE COPY/TWO COPIES/ .... N COPIES<br>SELL THROUGH<br>  ①COMPLETE<br>  ②TIME LIMITED<br>  ③PAY PER PLAY N<br><br>SELL THROUGH-SCMS<br>COPY FREE/ONE COPY/NO COPY /ONE COPY HAS BEEN MADE<br>RECORDING CHARGE PAY PER SCMS COPY N<br>COPY CONTROL TICKET PURCHASED NUMBER<br>PAY PER COPY<br>PAY PER BLOCK<br>COMPATIBILITY WITH SCMS APPARATUS<br>      ①EMD -->SCMS<br>      ②SCMS -->EMD |

FIG.7

USAGE CONTROL STATUS (UCS)

| |
|---|
| CONTENT ID FOR MANAGING ASSET MANAGEMENT AT CONTENT PROVIDER |
| SIGNATURE (CONTENT PROVIDER SECRET KEY) |
| GLOBAL UNIQUE CONTENT ID FOR MANAGEMENT OF THIRD PARTY RELIABLE ORGANIZATION |
| SIGNATURE (SECRET KEY OF THIRD PARTY RELIABLE ORGANIZATION) |
| SERVICE PROVIDER INFORMATION |
| DISTRUBUTION SERVICE NAME |
| CONTENT ID FOR MANAGEMENT OF DISTRIBUTION SERVICE AT SERVICE PROVIDER |
| SIGNATURE (SERVICE PROVIDER SECRET KEY) |
| ISSUER INFORMATION  HNG-ID/SAM_ID/MEDIA SAM_ID |
| PURCHASER INFORMATION  USER ID |
| SETTLEMENT MEANS SELECTED BY PURCHASER<br>THIRD PARTY RELIABLE ORGANIZATION/PASS FROM HAND TO HAND (ELECTRONIC MONEY) |
| PURCHASER SETTLEMENT MEANS INFORMATION<br>    ①BANK, REGISTERED ACCOUNT<br>    ②CREDIT CARD COMPANY<br>    ③CREDIT CARD NUMBER |
| PURCHASE TRACE INFORMATION<br>  (FIRST PURCHASE)    PURCHASE DATE/PURCHASER INFORMATION/ ISSUER INFORMATION<br>                                 PURCHASE APPARATUS INFORMATION/PURCHASE MEDIUM INFORMATION, ETC.<br>  (SECOND PERCHASE)  PURCHASE DATE/PURCHASER INFORMATION/ ISSUER INFORMATION<br>                                 PURCHASE APPARATUS INFORMATION/PURCHASE MEDIUM INFORMATION, ETC.<br>  (N-TH PURCHASE)    PURCHASE DATE/PURCHASER INFORMATION/ ISSUER INFORMATION<br>                                 PURCHASE APPARATUS INFORMATION/PURCHASE MEDIUM INFORMATION, ETC. |
| CONTENT SALE PRICE  PT (PRICE TAG) |
| COUNTRY, AREA CODE AT PURCHASE AND USAGE |
| USAGE SPACE EXAMINATION INFORMATION (ID LIST OF EACH ENTITY) |
| DISCOUNT INFORMATION POSSESSED BY PURCHASER IN DISTRIBUTION SERVICE (MILEAGE/DISCOUNT COUPONS) |
| DISCOUNT INFORMATION POSSESSED BY PURCHASER AND USER IN PURCHASE AND USAGE OF CONTENT UNIT (MILEAGE/DISCOUNT COUPON) |
| USAGE CONTROL<br>REPRODUCTION CHARGE PAY-PER-USE<br>    UPPER LIMIT OF COPIES (-->SELL THROUGH)<br>    PRICE OF ONE COPY/TWO COPIES/....N COPIES |

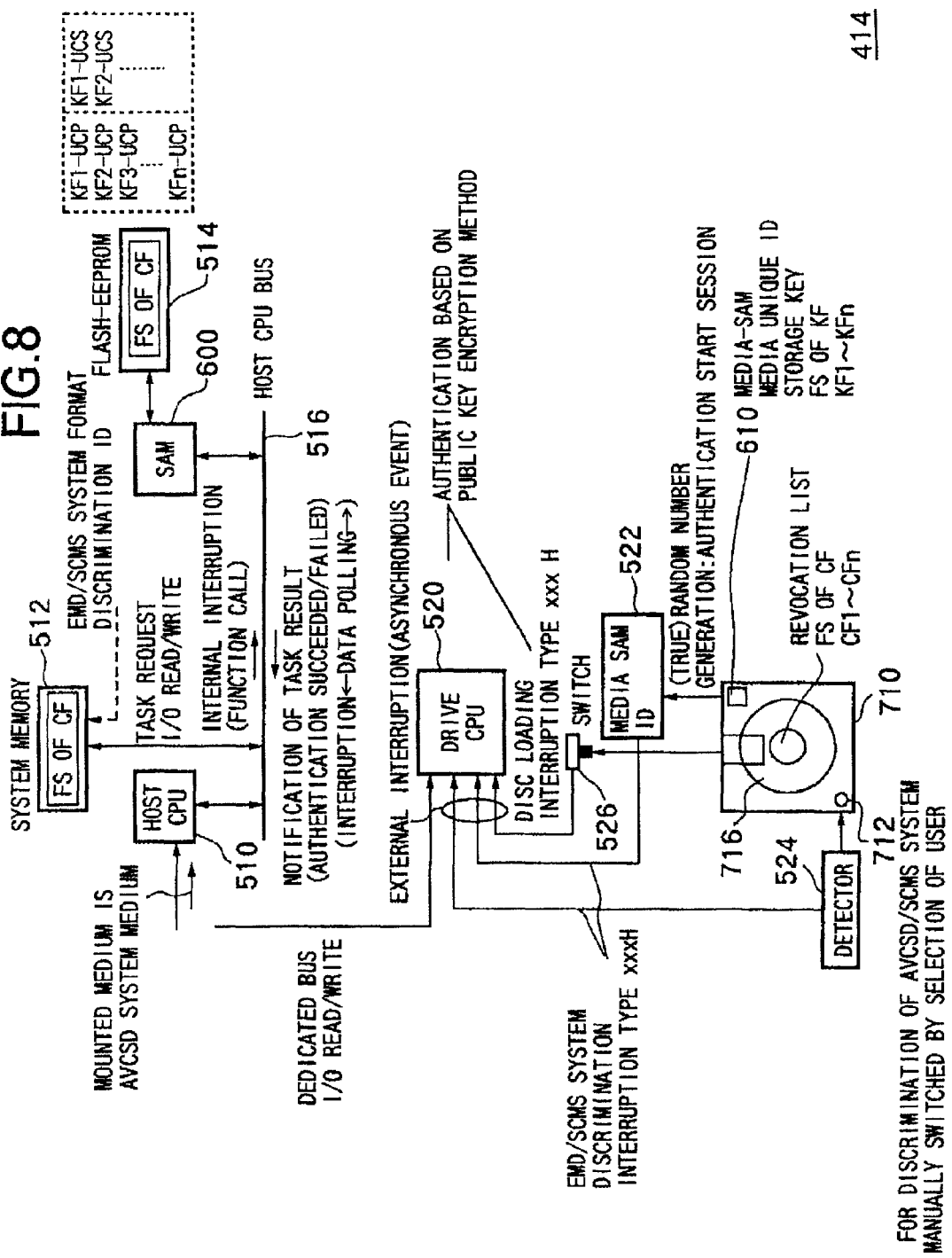

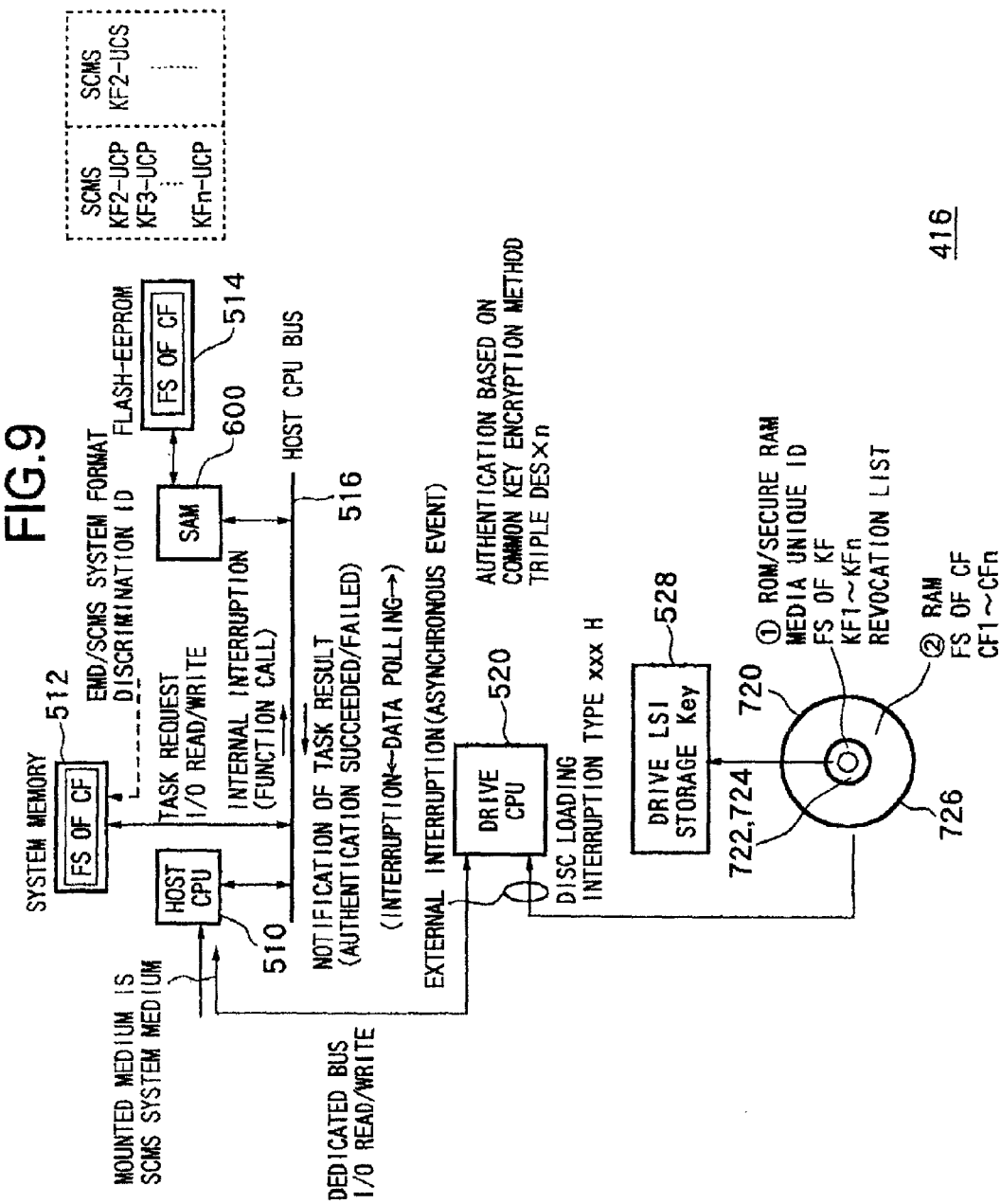

FIG.15

USAGE SPACE TABLE

| CONTENT USAGE CONTROL POLICY UCP/UCS, U-TOC | |
|---|---|
| EMD SYSTEM CONTENT/SCMS SYSTEM CONTENT  U-TOC<br>RIGHT CLEARING OF CONTENT  UCP<br>SIGNAL PARAMETERS, COMPRESSION CODEC METHOD  UCP<br>DISPLAY FUNCTION OF RECOMMENDED MONITOR  UCP<br>PERSONAL INFORMATION(PURCHASER INFORMATION)  UCS<br>RIGHT CLEARING(PROFIT DISTRIBUTION)DATA  UCS | CONCERNED ENTITY ID<br>CONTENT PROVIDER ID<br>SERVICE PROVIDER ID<br>THIRD PARTY RELIABLE<br>ORGANIZATION ID |
| REPRODUCTION APPARATUS  HNG-ID | MEDIUM MOUNTED IN REPRODUCTION APPARATUS |
| EMD SYSTEM APPARATUS/SCMS SYSTEM APPARATUS<br>BIT STREAM RECODER OR/NOT<br>SIGNAL PARAMETERS<br>COMPRESSION CODEC METHOD<br>DISPLAY CAPABILITY OF MONITOR CONNECTED<br>FORMAT CONVERSION FUNCTION EXISTS/NOT EXIST<br>(WHERE IT EXISTS, WHICH CONVERSION FUNCTION IS HELD?)<br>　　EG. 1BIT, 1.2882M→16BIT, 44.1K<br>RIGHT CLEARING (PROFIT DISTRIBUTION)<br>USE DATA<br>ID OF CONCERNED ENTITY<br>APPARATUS ID<br>ID OF APPARATUS DEVELOPING MANUFACTURER<br>ID OF OTHER CONCERNED ENTITY TO WHICH PROFIT SHOULD BE DISTRIBUTED<br>ID OF REGISTERED THIRD PARTY RELIABLE ORGANIZATION | EMD SYSTEM MEDIUM/SCMS SYSTEM MEDIUM<br>MEDIUM TYPE　①TYPE OF MEDIUM<br>　　　　　　　②ROM/RAM<br><br>RIGHT CLEARING (PROFIT DISTRIBUTION)<br>USE DATA<br>ID OF CONCERNED ENTITY<br>MEDIUM ID<br>ID OF MEDIUM DEVELOPING MANUFACTURER<br>ID OF OTHER CONCERNED ENTITY TO WHICH PROFIT SHOULD BE DISTRIBUTED<br>ID OF REGISTERED THIRD PARTY RELIABLE ORGANIZATION |
| RECORDING APPARATUS  HNG-ID | MEDIUM MOUNTED IN RECORDING APPARATUS |
| EMD SYSTEM APPARATUS/SCMS SYSTEM APPARATUS<br>BIT STREAM RECODER OR/NOT<br>SIGNAL PARAMETERS<br>COMPRESSION CODEC METHOD<br>DISPLAY CAPABILITY OF MONITOR CONNECTED<br>PARAMETER CONVERSION FUNCTION EXISTS/NOT EXIST<br>(WHERE IT EXISTS, WHICH CONVERSION FUNCTION IS HELD?)<br>　　EG. 1BIT, 1.2882M→16BIT, 44.1K<br>RIGHT CLEARING (PROFIT DISTRIBUTION)<br>USE DATA<br>ID OF CONCERNED ENTITY<br>APPARATUS ID<br>ID OF APPARATUS DEVELOPING MANUFACTURER<br>ID OF OTHER CONCERNED ENTITY TO WHICH PROFIT SHOULD BE DISTRIBUTED<br>ID OF REGISTERED THIRD PARTY RELIABLE ORGANIZATION | EMD SYSTEM MEDIUM/SCMS SYSTEM MEDIUM<br>MEDIUM TYPE　①TYPE OF MEDIUM<br>　　　　　　　②ROM/RAM<br>RIGHT CLEARING (PROFIT DISTRIBUTION)<br>USE DATA<br>ID OF CONCERNED ENTITY<br>MEDIUM ID<br>ID OF MEDIUM (DEVELOPMEMT MAKER)<br>ID OF OTHER CONCERNED ENTITY TO WHICH PROFIT SHOULD BE DISTRIBUTED<br>ID OF REGISTERED THIRD PARTY RELIABLE ORGANIZATION |

FIG.16

USAGE SPACE EXAMINATION IN HOME NETWORK (SIMULTANEOUS ONE-TO-MANY CORRESPONDENCE)

| CONTENT UCP | REPRODUCTION APPARATUS | REPRODUCTION MEDIUM | RECORDING APPARATUS 1 | RECORDING MEDIUM 1 | RECORDING APPARATUS 2 | RECORDING MEDIUM 2-1 | RECORDING MEDIUM 2-2 | RECORDING MEDIUM 2-3 |
|---|---|---|---|---|---|---|---|---|
| | | | | | | | | |

DATA DISTRIBUTION SYSTEM AND METHOD OF SAME, DATA PROCESSING APPARATUS AND METHOD OF SAME, AND DATA RECORDING MEDIUM

BACKGROUND OF THE INVENTION

1. Field of the Invention

The present invention relates to a data distribution system which data of various specifications, recording media, recording apparatuses, reproducing, apparatuses, and signals are mixed together and which various ownership rights are set, wherein data is distributed while suitably clearing rights, controlling copying, converting signals, distributing profits, and other performing processing, and a method of the same, a data processing apparatus preferred when applied to a data distribution system and a method of the same, and a data recording medium.

2. Description of the Related Art

Due to the advances made in recording technology and signal processing technology in recent years, the systems for recording for example music data have diversified. For example, even looking at the recording media, there are now media of various forms, various systems, and various formats. Accordingly, there are also various types of recording apparatuses and reproducing apparatuses. Further, the music data itself comes in various signal parameters, various compression systems, and various specifications. Further, as additional functions, various signals are superimposed on the music data for use for prevention of illicit copying, for clearing of rights, etc.

Summarizing the disadvantages to be solved by the invention, due to the appearance of such a variety of systems and specifications, there is the disadvantage in that it is difficult to convert formats or achieve compatibility among them.

While various specifications of data and media have appeared, these are also connected by networks making the transfer of the data itself easy. While transfer is possible, however, there is the disadvantage that the data cannot be used since the data differs in the compression method, format, etc.

In recent years, the distribution of various forms of data via the network is now becoming commonplace as a business. Even in such a distribution system, such a disadvantage has occurred. Since there are various formats, the disadvantage easily arises of the format being mistaken or the data not being suitably converted and therefore the transmitted data not being able to be distributed in a suitable form. Further, the disadvantage also easily arises that important data, for example charge data, is destroyed or becomes clear to the outside due to unsuitable conversion.

SUMMARY OF THE INVENTION

An object of the present invention is to provide a data distribution system capable of suitably grasping an operating environment even in a system which various types of apparatuses are connected and thereby capable of suitably distributing data, of course, and also controlling copying of the data, conversion of signals, charge processing, distribution of profit, and other various processing, and a method of the same, a data processing apparatus preferred when applied to such a data distribution system and a method of same, and a data recording medium.

Accordingly to a first aspect of the present invention, there is provided a data distribution system comprising a reproducing apparatus for reproducing content data to be distributed from a mounted recording medium, a recording apparatus for recording the reproduced content data on a mounted recording medium, an examining means for examining the type of the content data recorded on the recording medium mounted in the reproducing apparatus, the recording medium mounted in the reproducing apparatus, the reproducing apparatus, the recording medium mounted in the recording apparatus, and the recording apparatus, and a controlling means for controlling transfer of the content data from the recording medium mounted in the reproducing apparatus to the recording medium mounted in the recording apparatus based on results of the examination.

Preferably, the examining means examines whether the content data to be distributed is content data of a first type which is distributed in an encrypted state or content data of a second type which is distributed in an unencrypted state, examines whether the recording medium is a recording medium of a first type having a configuration enabling recorded data to be effectively read out by performing authentication processing or a recording medium of a second type having no such configuration and enabling the recorded data to be read out freely, examines whether the reproducing apparatus is a reproducing apparatus of a first type for reproducing after the authentication processing or a reproducing apparatus of a second type for reproducing without that processing, and examines whether the recording apparatus is a recording apparatus of a first type for recording after the authentication processing or a recording apparatus of a second type for recording without that processing.

According to a second aspect of the present invention, there is provided another data distribution system comprising a reproducing apparatus for reproducing content data to be distributed from a mounted recording medium, a recording apparatus for recording the reproduced content data on a mounted recording medium, an examining means for examining owners of the recording medium mounted in the reproducing apparatus, the reproducing apparatus, a recording medium mounted in the recording apparatus, and the recording apparatus, and a controlling means for controlling a transfer of the content data from the recording medium mounted in the reproducing apparatus to the recording medium mounted in the recording apparatus based on results of the examination.

According to a third aspect of the present invention, there is provided another data distribution system comprising a reproducing apparatus for reproducing content data to be distributed from a mounted recording medium, a recording apparatus for recording the reproduced content data on a mounted recording medium, an examining means for examining elements for which some sort of profits should be distributed relating to the processing of the transfer of the content data from the recording medium mounted in the reproducing apparatus to the recording medium mounted in the recording apparatus, and a processing means for performing predetermined processing so that the profit is distributed to the elements based on results of the examination.

According to a fourth aspect of the present invention, there is provided a data communication system comprising a reproducing apparatus for reproducing content data to be distributed from a mounted recording medium, a recording apparatus for recording the reproduced content data on a mounted recording medium, an examining means for examining specifications of a signal of the content data recorded on the recording medium mounted in the reproducing apparatus, specifications of a signal of reproduction processing in the reproducing apparatus, and specifications of a signal of recording processing by the recording apparatus, and a signal converting means for converting a signal of the content data so that the transfer of the content data from the recording medium mounted in the reproducing apparatus to the recording medium mounted in the recording apparatus can be suitably carried out based on results of the examination.

According to a fifth aspect of the present invention, there is provided a data distribution method comprising the steps of examining types of content data to be distributed recorded on a recording medium mounted in a reproducing apparatus, a recording medium mounted in the reproducing apparatus, the reproducing apparatus, a recording medium mounted in the recording apparatus, and the recording apparatus and controlling the transfer of the content data from the recording medium mounted in the reproducing apparatus to the recording medium mounted in the recording apparatus based on results of the examination.

According to a sixth aspect of the present invention, there is provided a data distribution method comprising the steps of examining owners of a recording medium mounted in a reproducing apparatus and with content data to be distributed recorded thereon, the reproducing apparatus, a recording medium mounted in the recording apparatus, and the recording apparatus and controlling the transfer of the content data from the recording medium mounted in the reproducing apparatus to the recording medium mounted in the recording apparatus based on results of the examination.

According to a seventh aspect of the present invention, there is provided a data distribution method comprising the steps of examining elements for which some sort of profit should be distributed relating to processing for transfer of the content data from a recording medium mounted in a reproducing apparatus to a recording medium mounted in a recording apparatus and transmitting a list of elements for which the profit should be distributed based on the results of the examination to an organization for managing the profit relating to the distribution of the related content data.

According to an eighth aspect of the present invention, there is provided another data distribution method comprising the steps of examining specifications of a signal of content data recorded on a recording medium mounted in a reproducing apparatus, specifications of a signal of reproduction processing in the reproducing apparatus, and specifications of a signals of recording processing of a recording apparatus, converting the signal of the content data so that the transfer of the content data from the recording medium mounted in the reproducing apparatus to the recording medium mounted in the recording apparatus can be suitably carried out based on results of the examination, and recording the converted signal on the recording medium mounted in the recording apparatus.

According to a ninth aspect of the present invention, there is provided a data processing apparatus comprising a reproducing apparatus for reproducing content data to be distributed from a mounted recording medium, an examining means for examining types of the content data recorded on a recording medium mounted in the reproducing apparatus, a recording medium mounted in the reproducing apparatus, and the reproducing apparatus and a controlling means for controlling the reproduction of the content data from the recording medium mounted in the reproducing apparatus based on results of the examination.

According to a 10th aspect of the present invention, there is provided another data processing apparatus comprising an examining means for examining elements for which some sort of profit should be distributed relating to reproduction of content data to be distributed from a recording medium mounted in a reproducing apparatus and a transmitting means for transmitting a list of elements for which the profit should be distributed as a result of the examination to an organization managing the profit relating to the distribution of the related content data.

According to an 11th aspect of the present invention, there is provided a data processing method comprising the steps of examining the types of content data to be distributed recorded on a recording medium mounted in a reproducing apparatus, a recording medium mounted in the reproducing apparatus, and the reproducing apparatus and controlling the reproduction of content data from the recording medium mounted in the reproducing apparatus based on results of the examination.

According to a 12th aspect of the present invention, there is provided a data processing method comprising the steps of examining elements for which some sort of profit should be distributed relating to reproduction of content data to be distributed from a recording medium mounted in a reproducing apparatus and transmitting a list of the elements for which the profit should be distributed as the result of the examination to an organization for managing profit related to the distribution of the related content data.

According to a 13th aspect of the present invention, there is provided a data processing apparatus comprising a recording apparatus for recording content data to be distributed on a mounted recording medium, an examining means for examining types of the content data, the recording medium, and the recording apparatus, and a controlling means for controlling the recording of the content data onto the recording medium based on results of the examination.

According to a 14th aspect of the present invention, there is provided a data processing apparatus comprising an examining means for examining elements for which some sort of profit should be distributed relating to processing for recording content data to be distributed on a recording medium mounted in a recording apparatus and a transmitting means for transmitting a list of elements for which the profit should be distributed as a result of the examination to an organization for managing the profit relating to the distribution of the related content data.

According to a 15th aspect of the present invention, there is provided a data processing method comprising the steps of examining types of content data to be distributed, a recording medium, and a recording apparatus and controlling the recording of the content data onto the recording medium in the recording apparatus based on results of the examination.

According to a 16th aspect of the present invention, there is provided a data processing method comprising the steps of examining elements for which some sort of profit should be distributed relating to processing of recording content data to be distributed on a recording medium mounted in a recording apparatus and transmitting a list of elements for which the profit should be distributed as a result of the examination to an organization for managing the profit relating to the distribution of the related content data.

According to a 17th aspect of the present invention, there is provided a data recording medium having a configuration enabling effective read out of recorded data by authentication processing, comprising a switch for selecting whether the related recording medium is to be used as a recording medium having a configuration enabling effective read out of recorded data by authentication processing or used as a recording medium not having such a configuration and enabling free read out of the recorded data.

BRIEF DESCRIPTION OF THE DRAWINGS

These and other objects and features of the present invention will be more apparent from the following description of the preferred embodiments given with reference to the accompanying drawings, wherein:

FIG. 6 is a view for explaining a usage control policy (UCP);

FIG. 7 is a view for explaining a usage control status (UCS);

FIG. 8 is a view of a first example of the configuration of a home network apparatus;

FIG. 9 is a view of a second example of the configuration of a home network apparatus;

FIG. 15 is a view for explaining a usage space descriptor (usage space table);

FIG. 16 is a view of a usage space examination table for explaining the usage space examination in a case of copying from one reproducing apparatus to a plurality of recording apparatuses;

FIG. 34 is a view of a case of sell through;

DESCRIPTION OF THE PREFERRED EMBODIMENTS

An embodiment of the present invention will be explained next by referring to FIG. 1 to FIG. 39.

In the present embodiment, an electronic music distribution system (EMD system) for distributing music via a network or package medium while suitably clearing rights. The present invention will be explained by explaining a method of distribution and a method of circulation of various forms of music data including music data of a form not based on the EMD system under the environment of the EMD system and systems and apparatuses relating to the same.

EMD System

Configuration of EMD system

First, an explanation will be given of the overall configuration of an EMD system 1 by referring to FIG. 1.

Figure 1:
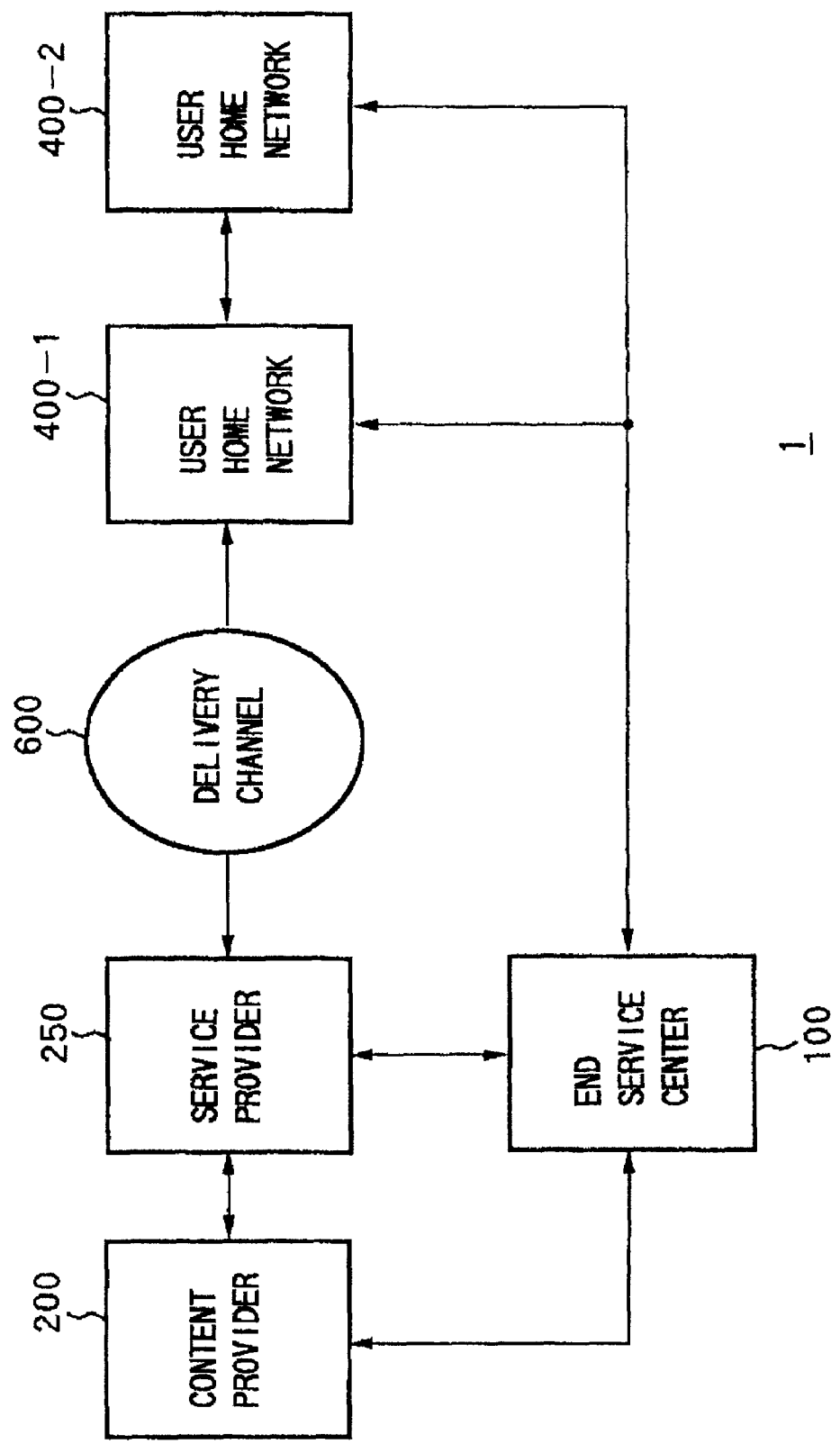
FIG. 1 is a block diagram of the configuration of an electronic music distribution (EMD) system according to an embodiment of the present invention.

FIG. 1 is a block diagram of the configuration of the EMD system 1.

The EMD system 1 has an EMD service center 100, a content provider 200, a service provider 250, a delivery channel 300, and a user home network 400.

Note that the EMD system 1 shown in FIG. 1 is configured with one each EMD service center 100, content provider 200, and service provider 250 and two user home networks 400, but this is the configuration preferred for the explanation. As will be explained later, the number of each component is arbitrary.

EMD Service Center 100

The EMD service center 100 manages the entire EMD system 1 so that the content data is distributed while being suitably cleared for rights, in other words, while being suitably charged.

Namely, it stores and manages IDs of the content provider 200, service provider 250, user home network 400, and the apparatuses of the user home network 400 and manages the key data or certificate data used when these components send various data and certifies their legitimacy.

Specifically, for example, the EMD service center 100 distributes a distribution key for encrypting content and distributing the same to the content provider 200 and distributes a distribution key for decrypting the encryption to the user home network 400 in a state which it can be used conditional on proper clearing of the rights and thereby controls the distribution of the content.

Also, it receives information relating to the usage of the content in accordance with the usage of the content from the user home network 400, charges, and settles the charges.

Namely, it collects the charge for the usage of content from the user and distributes the profit to concerned persons involved from the production to the circulation of the content such as the content provider 200 and the service provider 250 and, in certain cases, the provider of the apparatus of the user home network 400.

For such processing, the EMD service center 100 stores information such as the IDs and attributes of the apparatuses connected to the user home network 400 as a database. As will be explained later, various types of apparatuses are connected to the user home network 400. At least for EMD system compatible apparatuses mounting secure application modules (SAMs) and able to clear rights in a secure state (hereinafter sometimes also referred to as EMD hardware), however, basically the information of all these apparatuses are registered in the EMD service center 100 and managed by the EMD service center 100.

For processing to distribute profits, the EMD service center 100 stores information for specifying the concerned person and charging or paying for every distributed content data, data for determining a profit distribution rate per concerned person, various conversion data for determining a final usage price of content based on the usage information input from the user home network 400, and so on. The user home network 400 explained later successively transmits the usage information based on the usage of the content, so the purchase price is determined by referring to these stored data, the distribution of profit is determined, and the actual fees are collected and paid for.

Note that one EMD service center 100 preferably exists for every EMD system 1.

Content Provider 200

Figure 2:
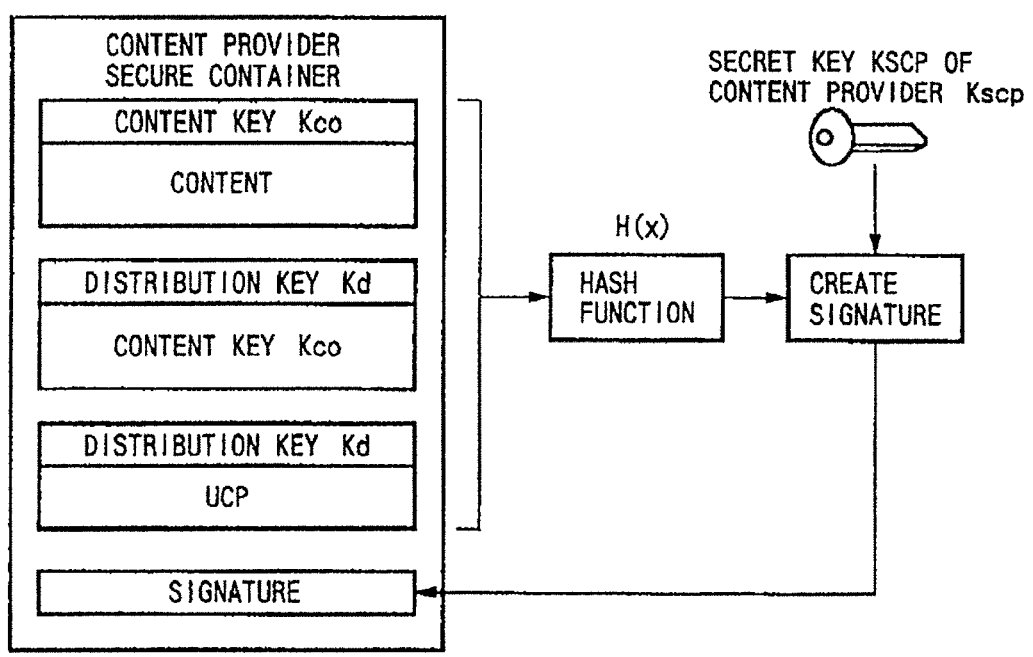
FIG. 2 is a view for explaining a content provider secure container created by a content provider of the EMD system shown in FIG. 1.

The content provider 200 is the copyright holder of the content data (music data in the present embodiment). It creates a content provider secure container as shown in FIG. 2 with respect to the content data to be distributed and supplies this to the distributor, that is, the service provider 250.

Specifically, the content provider 200 superimposes copyright information for certifying that the content is its own on the content data as watermark information (electronic watermark information). Further, it superimposes watermark information with a copy prohibition bit for prohibiting copying via an analog interface buried therein on that, compresses the content data, and encrypts the same by a content key created by itself.

Also, it creates a usage control policy (UCP) determining the policy for handling the content and encrypts the content key and UCP by the distribution key distributed from the EMD service center 100.

Then, it obtains hash values for the content encrypted by the content key and the content key encrypted by the distribution key and UCP and creates a signature by using the secret key of the content provider 200.

It adds this signature to each previous data to create the content provider secure container and supplies the same to the service provider 250.

Note that there is a content provider 200 for every group holding a copyright and managing content corresponding to for example a conventional record company. There are a large of content providers with respect to one EMD system 1.

Service Provider 250

Figure 3:
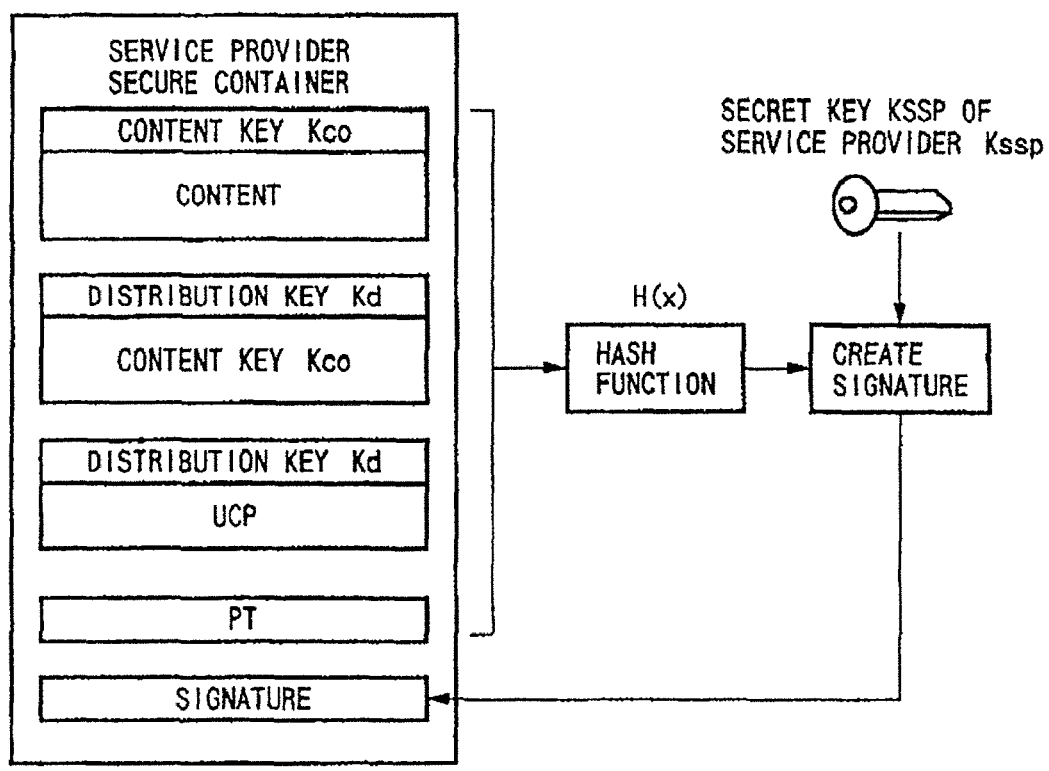
FIG. 3 is a view for explaining a service provider secure container created by a service provider of the EMD system shown in FIG. 1.

The service provider 250 creates the service provider secure container as shown in FIG. 3 with respect to the content provider secure container supplied from the content provider 200 and distributes this via any delivery channel 300 to a user home network $400_{-1}$.

Specifically, the service provider 250 verifies the signature of the content provider secure container by a public key of the content provider 200 supplied from the EMD service center 100.

Next, it adds new price information (PT: price tag) adding on an amount of profit for the distribution service it performs itself, obtains the hash value of each data, and creates a signature by using the secret key of the service provider 250.

It adds this signature to each previous data to create the service provider secure container and distributes the same via the delivery channel 300 to the user home network 400.

Note that there are also a large number of these service providers 250 for one EMD system 1.

Delivery Channel 300

The delivery channel 300 is any delivery channel. Specifically, it includes any distributing means, for example, distribution by a communication network such as the Internet, a cable television system, a satellite broadcast system, an ATM communication network, a mobile band communication network, and a package medium.

User Home Network 400

The user home networks $400_{-1}$ and $400_{-2}$ receive the service provider secure containers distributed from the service provider 250 and actually use the content data contained in them according to need.

Figure 4:
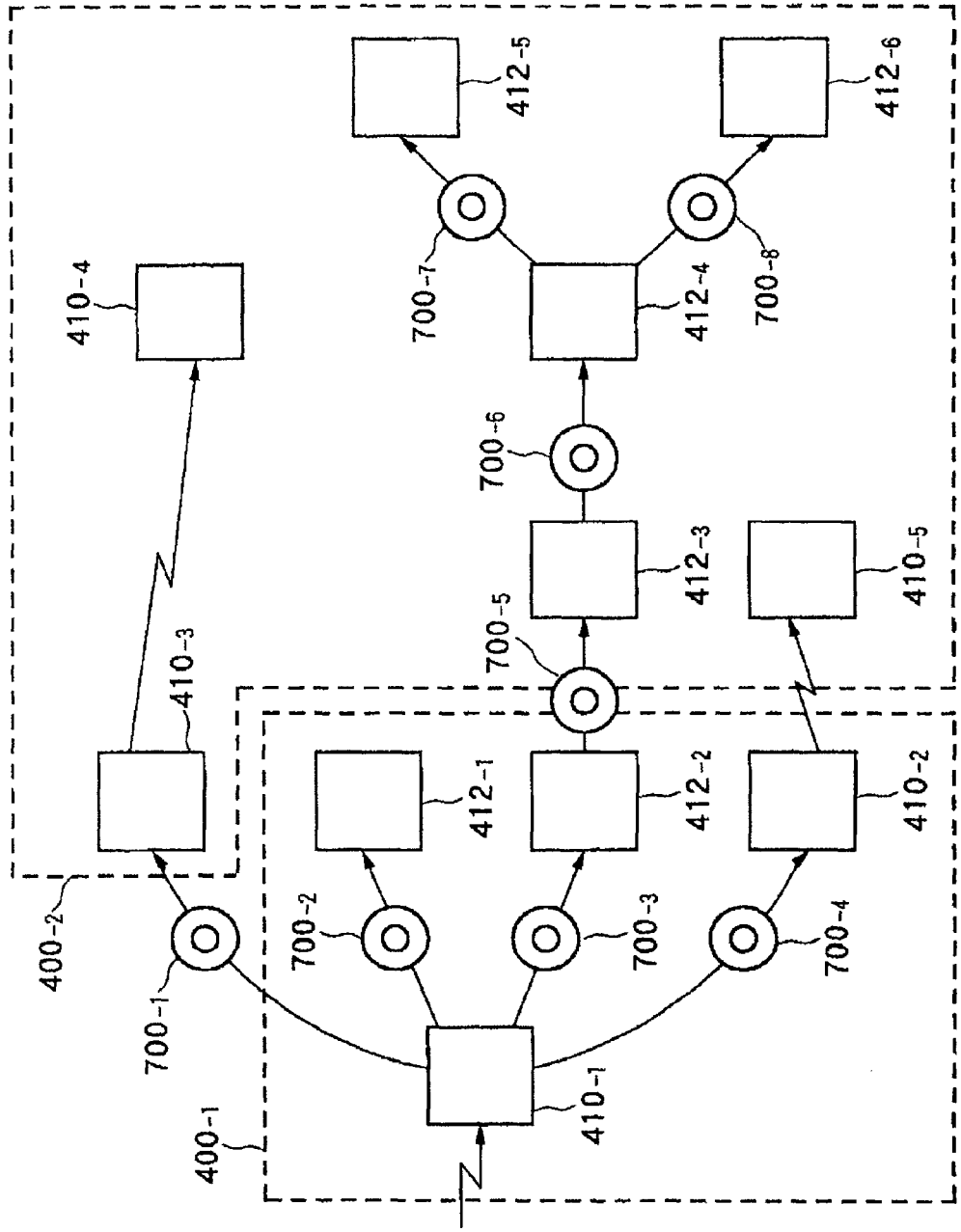
FIG. 4 is a view of the general configuration of a user home network of the EMD system shown in FIG. 1.

The general configuration of a user home network 400 is shown in FIG. 4.

The user home network 400 is preferably thought of as the group of recording and/or reproducing apparatuses of music data in each home, but strictly speaking is comprised of any various apparatuses without regard as to being inside or outside of the home.

As the apparatuses to be connected there, there are data recording apparatuses, reproducing apparatuses, and recording and/or reproducing apparatuses. Here, however, they are shown classified to network apparatuses 410 having a communication function and simple recording and/or reproducing apparatuses 412 not having a communication function by themselves, but wherein recording and reproduction of the music data are carried out via a recording medium.

Namely, the first user home network $400_{-1}$ shown in FIG. 4 has two network apparatuses $410_{-1}$ and $410_{-2}$ and two recording and/or reproducing apparatuses $412_{-1}$ and $412_{-2}$, while the second user home network $400_{-2}$ has three network apparatuses $410_{-3}$ to $410_{-5}$ and four recording and/or reproducing apparatuses $412_{-3}$ to $412_{-6}$.

The content data can be transferred by the communication channel among the network apparatuses 410, but among the recording and/or reproducing apparatuses 412, the content data is moved via recording media 700.

All of these apparatuses carry chips, referred to as secure application module (SAM) chips explained later, for suitably clearing rights including the decryption of the encrypted content data and charging and copy control. The recording and reproduction of the music data are carried out while suitably clearing the rights by these chips. The distribution key distributed from the EMD service center 100 to the user home network 400 explained above is mounted in the SAM chip of each apparatus.

Also, each user home network 400 comprises at least one network apparatus 410 so that communication with the EMD service center 100 is possible. Information such as the state of usage of the content in this user home network 400 is notified to the EMD service center 100 via this network apparatus 410.

When any network apparatus 410 in such a user home network 400 receives a service provider secure container from the delivery channel 300, it stores this once in a download memory of the network apparatus and verifies the signature by the public key of the service provider 250 supplied from the EMD service center 100.

Then, when the type of purchase is determined in response to a request for reproduction from each apparatus etc., a usage control status (UCS) explained later is created, the distribution key is removed at the SAM, a usage log serving as the charging information is stored in the SAM, and the content is purchased.

Figure 5:
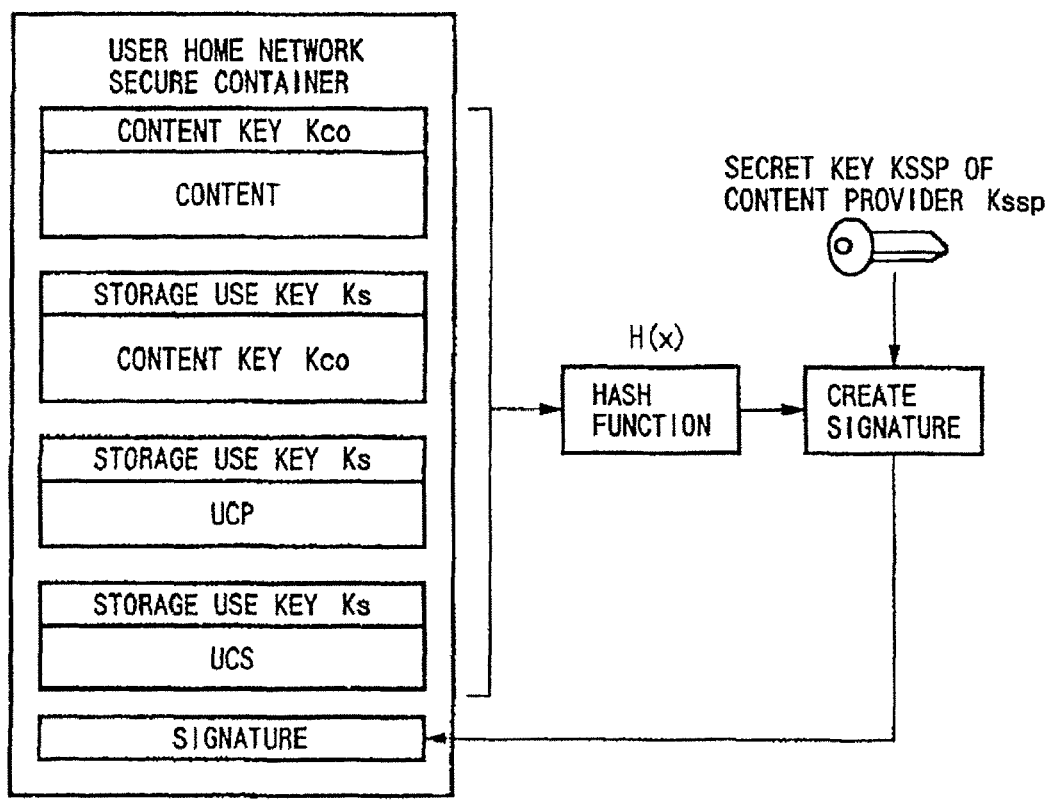
FIG. 5 is a view for explaining a user home network secure container created in the user home network of the EMD system shown in FIG. 1.

The purchased content data is newly locked by a storage key depending upon for example the recording medium, added with signature data in the same way as the service provider secure container, and circulated in the user home network 400 after that in the type of a user home network secure container as shown in FIG. 5.

Secure Container

In this way, in the EMD system 1, content data is transmitted in the form of a secure container such as the content provider secure container shown in FIG. 2, service provider secure container shown in FIG. 3, and user home network secure container shown in FIG. 5.

The configuration of each secure container is as explained above. Here, however, an explanation will be given of the UCP and UCS contained in each secure container.

UCP

The UCP is data given by the content provider 200 and describing the distribution policy and handling policy of the content data.

A concrete content of the UCP is shown in FIG. 6.

As illustrated, the UCP contains information such as the ID for specifying content data, signature data of the content provider 200 and the EMD service center 100, various information relating to the distribution of the content data, various information concerning the content and attributes of the content, handling control information with respect to the usage space examination explained later, handling control information based on various conditions at the time of charging, and the usage form and the charge data of the content data.

Then, particularly, as the information relating to the present invention, information such as the signal parameters and the compression method of the content data, the handling control information with respect to the result of the usage space examination, and the usage control policy recording the handling policy and the price information with respect to each purchase type are recorded in this UCP.

Ucs

The UCS is data for indicating the state of usage created when purchasing the content data.

The concrete content of the UCS is shown in FIG. 7.

As illustrated, the UCS contains IDs and signatures of the content provider 200, EMD service center 100, and service provider 250, a purchaser ID concerning the purchase, settlement means, sales price, various information relating to discounts, etc.

Particularly, as information relating to the present invention, the result of examination of the usage space information explained later is recorded in this UCS.

Home Network Apparatus

Next, an explanation will be given of the configuration of typical apparatuses used in the user home network 400 of such an EMD system 1.

Note that the operations of these apparatuses will be explained at the explanation of the usage space examination later, so explanations are omitted.

FIG. 8 is a view of the configuration of principal portions of a recording and reproducing apparatus 414 for the recording and reproduction of data with respect to a recording medium 710 containing a SAM.

The recording and reproducing apparatus 414 has a host CPU 510, a system memory 512, a SAM 600, a flash EEPROM 514, a drive CPU 520, a media SAM I/F 522, an EMD system medium detector 524, and a medium detection switch 526.

The host CPU 510 is a CPU controlling the entire recording and reproducing apparatus 414.

The system memory 512 is a memory used for various processings in the host CPU 510. When a recording medium 710 is mounted, the file system of the content file is recorded.

The SAM 600 is a chip performing processing such as clearing of rights and decryption of content data. The SAM 600 is connected with the host CPU 510 by the medium detection switch 516 and controlled as an I/O from the host CPU 510. Namely, a task is requested to the SAM 600 by an I/O write operation, and the result of the task is sensed by an I/O read operation.

The flash EEPROM 514 is an externally attached memory of the SAM 600. When a recording medium 710 is mounted, the file system of the key file is recorded.

The drive CPU 520 is a control unit for controlling the entire read/write operation with respect to the recording medium. The drive CPU 520 is connected with the host CPU 510 by a dedicated bus.

The media SAM I/F 522 is an interface for communicating with the media SAM 610 of the recording medium 710.

The EMD system medium detector 524 detects the position of the manual switch of the recording medium 710 to detects whether the recording medium 710 is used as an EMD system medium or used as a SCMS system medium.

The medium detection switch 526 is a switch for detecting that a recording medium 710 is mounted in the recording and reproducing apparatus 414.

As a recording medium 710 mounted in such a recording and reproducing apparatus 414, as illustrated, a recording medium 710 as an EMD system medium having a media SAM 610 is mounted.

In the recording medium 710, the media SAM 610 checks the legitimacy of the recording and reproducing apparatus 414, clears the rights in the recorded content data, etc. Also, the media SAM 610 stores the unique ID of the medium, storage key, file system of the key file, the key file, etc.

Also, a RAM region 716 of the recording medium 710 records a list of unsuitable apparatuses, that is, a revocation list, the file system of the content file, and the content file.

Also, this recording medium 710 comprises a manual switch 712 for designating whether it is used as an SCMS system medium or used as an EMD system medium.

Also, FIG. 9 is a view of the configuration of principal portions of a recording and reproducing apparatus 416 recording and reproducing data with respect to a recording medium 720 not mounting a SAM but having a secure RAM region.

The recording and reproducing apparatus 416 has a host CPU 510, system memory 512, SAM 600, flash EEPROM 514, drive CPU 520, and drive LSI 528.

The configurations of the host CPU 510, system memory 512, SAM 600, flash EEPROM 514, and the drive CPU 520 are the same as the configurations of the recording and reproducing apparatus 414.

The drive LSI 528 is a drive circuit for accessing a ROM region 722 and a secure RAM region 724 of the recording medium 720.

Then, by storing the unique ID of the medium, storage key, file system of the key file, key file, etc. in the ROM and secure RAM regions of the recording medium 720 via such a drive LSI 528, even if the media SAM 610 is not mounted, the recording medium 720 can be treated as an EMD system medium.

Also, the recording medium 720 cannot create the storage key, which requires generation of random numbers, so the drive LSI 528 also creates the storage key.

Figure 10:
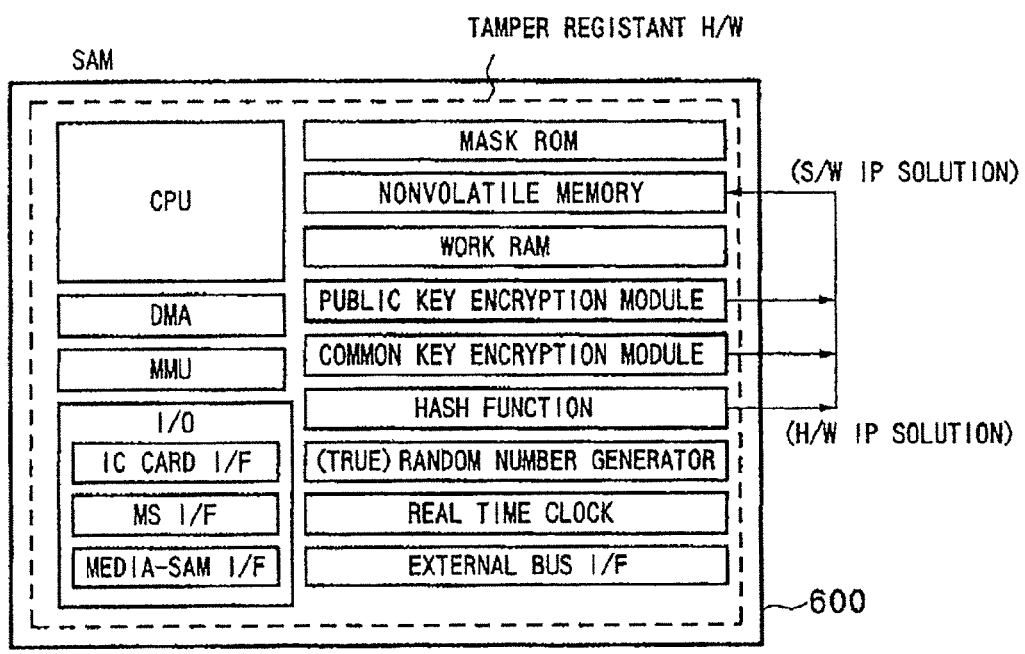
FIG. 10 is a view of the configuration of a secure application module (SAM)
Figure 12:
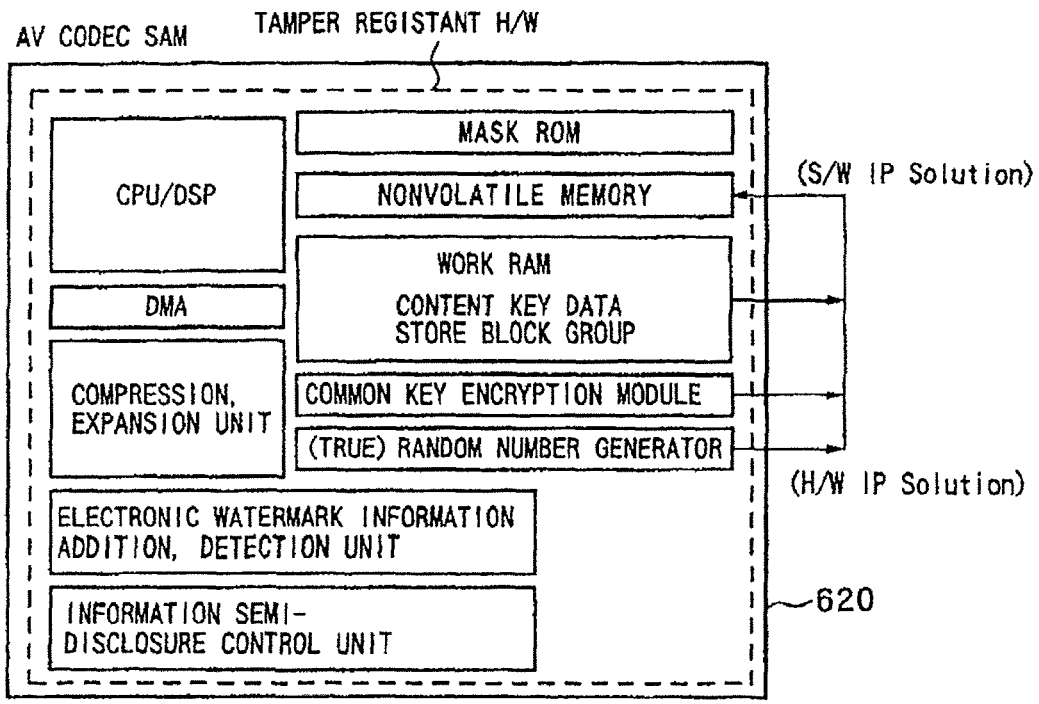
FIG. 12 is a view of the configuration of an audio- video (AV) codec SAM.
Figure 13:
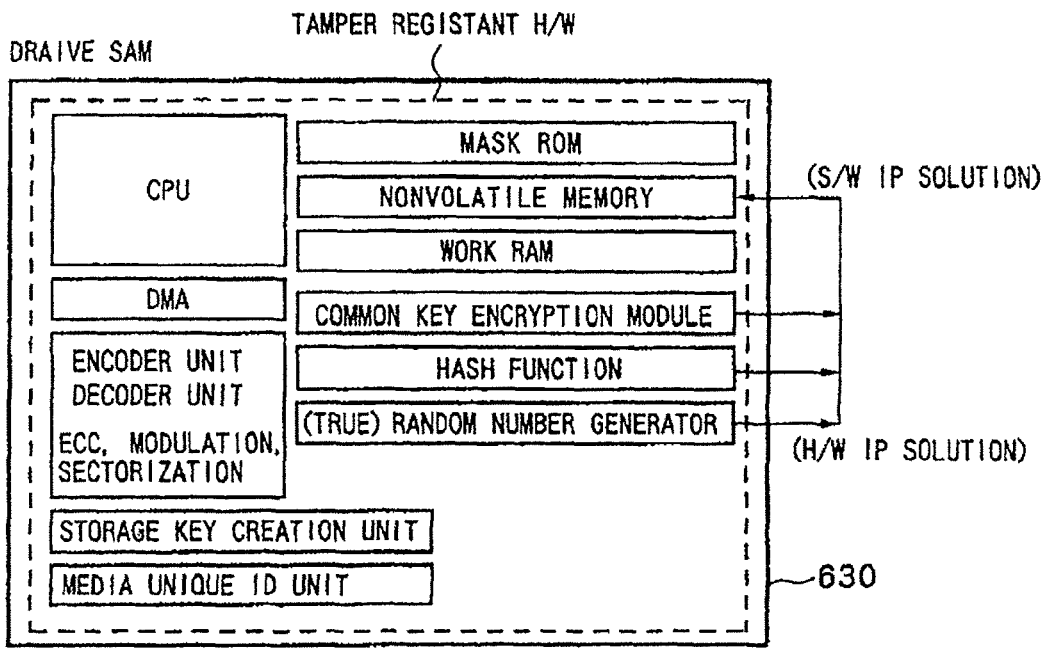
FIG. 13 is a view of the configuration of a drive SAM.

Note that such a home network apparatus, according to need, mounts a SAM 600 having the configuration as shown in FIG. 10, an AV codec SAM 620 as shown in FIG. 12, and a drive SAM 630 having the configuration as shown in FIG. 13.

Figure 11:
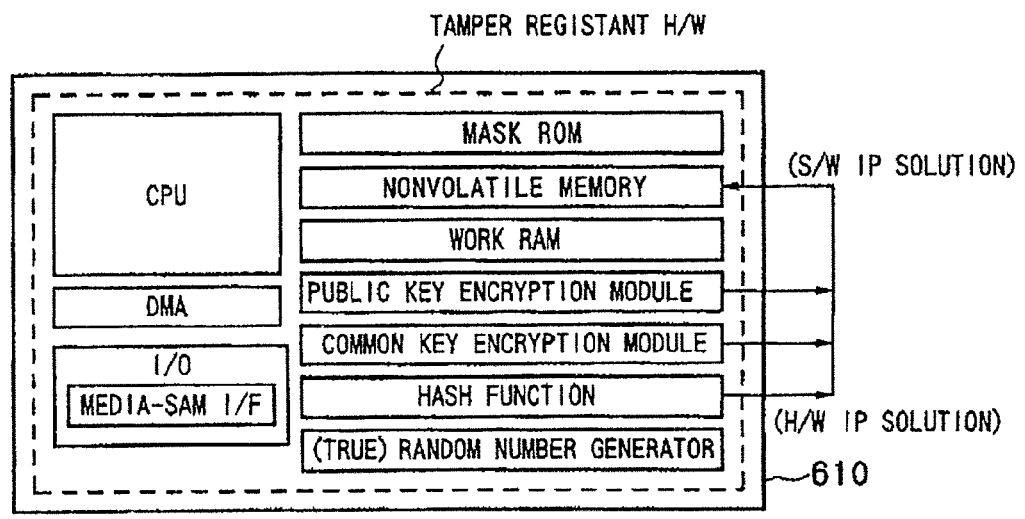
FIG. 11 is a view of the configuration of a media SAM.

Also, the recording medium 710 carries the media SAM 610 as shown in FIG. 11.

Usage Space Examination

Summary

In the EMD system 1 as explained above, it is assumed that SAMs are mounted in all apparatuses of the user home network 400 and that the rights are accordingly properly cleared and the content files handled.

In actuality, however, there are many analog apparatuses and SCMS apparatuses controlling copying by SCMS bits in homes or the like. Also, as the recording media, a large number of recording media with only simple RAM regions formed therein have spread in use.

As a result, actually, a user home network 400 is configured including also these apparatuses and recording media in many cases.

Also, on the other hand, even if viewing only the EMD system 1, this does not limit the signal parameters, compression and/or encoding methods, etc. of useable recording media and useable content data in any way. Accordingly, content data compressed and encoded by various signal parameters and various methods is used.

Figure 14:
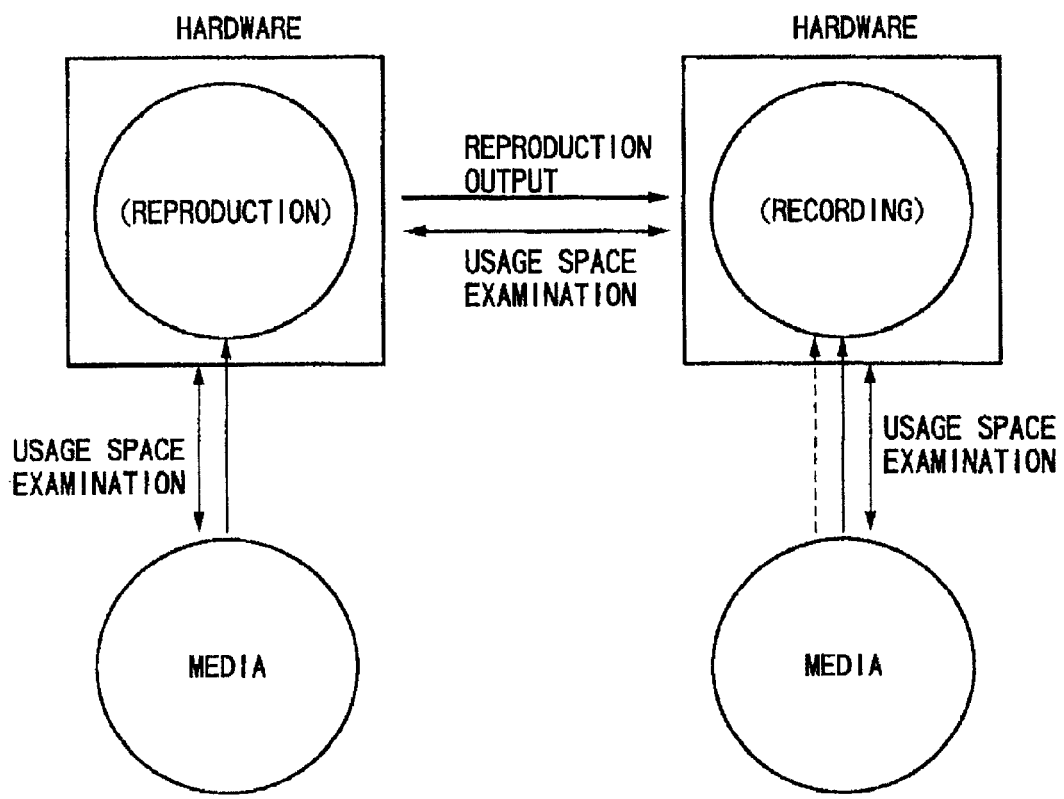
FIG. 14 is a view for explaining a concept of usage space examination.

When it is intended to copy for example the content data of a certain package medium as shown in FIG. 14 to another recording medium under such an environment, the copy cannot be made under the optimum conditions until the reproduction side recording media, reproduction side apparatuses, recording side apparatuses, and recording side recording media and all specifications of apparatuses and media are grasped and further the signal parameters, compression and encoding methods, etc. of the recorded content data are grasped. Further, proper clearing of rights cannot be achieved unless having a full grasp of such conditions.

Therefore, in the EMD system 1 examines and obtains a grasp of the recording side and reproduction side apparatuses, recording media, signal parameters, compression and encoding methods, and further the method of clearing rights etc. before making a copy. This is referred to as the usage space examination.

Below, an explanation will be given of the method of this usage space examination and the processing such as the copying of the content data after the usage space examination.

Usage Space Examination

The EMD system 1 of the present embodiment carries out the usage space examination in the apparatuses and SAMs from following four viewpoints.

1. Examination of EMD System or SCMS System

First of all, it is examined whether the content, hardware (apparatus), and the recording media to be processed are those of an EMD system compatible with the EMD system 1 or those of a conventional SCMS system not compatible with the EMD system 1, the recording/reproduction is controlled by this, and the rights thereby properly cleared and copying controlled.

Here, the EMD system and the SCMS system of the content, hardware, and the recording media are defined as follows:

The EMD system content is content encrypted and circulated together with the key file.

The SCMS system content is content circulated in the unencrypted state and a state which copying is controlled by the SCMS bit.

The EMD system hardware is an apparatus mounting an SAM and capable of clearing rights by the SAM.

The SCMS system hardware is an apparatus for controlling copying by the SCMS bit.

An EMD system medium is a recording medium having an authentication function in some form or another and includes two forms. One is a medium with an SAM (media SAM) mounted thereon and realizing an authentication function by this. The other is a medium having a secure RAM region on the medium and realizing an authentication function by processing from the outside using this secure RAM region.

An SCMS system medium is a medium having only an SCMS bit.

In order to suitably clear rights and control copying as explained heretofore, desirably the recording and reproduction among these content, hardwares, and recording media are prescribed as in the following Table 1.

TABLE 1

|  | SCMS system medium | | EMD system medium | |
| --- | --- | --- | --- | --- |
|  | EMD system content | SCMS system content | EMD system content | SCMS system content |
| SCMS system hardware | No | Yes | No | Yes |
| EMD system hardware | No | Yes | Yes | Yes |

The items of Table 1 will be sequentially explained next.

First, when recording or reproducing the EMD system content comprised by the encrypted content and the key file under the conditions of the top left of the table, that is, the combination of an SCMS system medium and SCMS system hardware, the encrypted content of the EMD system content cannot be processed by the SCMS system hardware, therefore, even if the EMD system content had been recorded on the SCMS system medium, it cannot be reproduced. Further, EMD system content cannot be newly recorded either.

Next, when recording or reproducing EMD system content under the conditions of the bottom left, that is, a combination of an SCMS system medium and EMD system hardware, processing that simply records and reproduces the content is technically possible. However, performing such processing with respect to a medium such as an SCMS system medium not configured relating to clearing rights in any way or configured to handle secure processing invalidates the right clearing of the EMD system 1 and becomes a cause of occurrence of false processing or illicit circulation. Accordingly, it is sufficient to prevent recording of the EMD system content to an SCMS system medium or, even if it has been recorded, prevent the reproduction of the EMD system content from the SCMS system medium.

Next, when recording or reproducing SCMS system content with respect to a combination of an SCMS system medium and SCMS system hardware, this same happens as with the copy control system based on a conventional SCMS bit. Both reproduction and recording are possible according to the SCMS bit.

Also, when recording or reproducing SCMS system content when mounting SCMS system medium in EMD system hardware, it is possible to prevent recording or reproduction as part of the specifications of the EMD system hardware. Alternatively, it is possible not to prevent this, but enable both reproduction and recording from the viewpoint of compatibility of the recording medium.

Next, when recording or producing EMD system content with respect to a combination of an EMD system medium and SCMS system hardware, in the same way as the case of the recording/reproduction of the EMD system content with respect to an SCMS system medium and SCMS system hardware explained above, the encrypted content of the EMD system content cannot be processed by the SCMS system hardware, so both of the recording and reproduction are impossible.

Next, when recording or reproducing EMD system content with respect to a combination of an EMD system medium and EMD system hardware, this case is the typical type of circulation of the present EMD system. Both recording and reproduction are possible according to the right clearing rules of the EMD system.

Next, when recording or reproducing SCMS system content with respect to a combination of an EMD system medium and SCMS system hardware, it is sufficient to treat the EMD system medium as an SCMS system medium. Therefore, recording/reproduction are technically possible. Further, recording/reproduction must be enabled also from the viewpoint of the compatibility of media.

Also, when recording or reproducing SCMS system content with respect to a combination of an EMD system medium and EMD system hardware, also in this case, it is sufficient to treat the EMD system medium as an SCMS system medium in the EMD system hardware. Therefore, recording/reproduction are technically possible. Recording/reproduction should be enabled also from the viewpoint of the compatibility of media in the same way as the previous case For such usage space examination, the EMD system 1 uses the following configuration:

First, by setting conditions enabling recording/reproduction as shown in Table 1, when an EMD system medium is set in EMD system hardware, sometimes an EMD system medium is used as an EMD system medium and sometimes it is used as an SCMS system medium. Therefore, as explained above by referring to FIG. 8, the EMD system medium comprises a manual switch 127 indicating the type of usage, that is, whether it is to be used as an EMD system medium or used as an SCMS system medium. The EMD system hardware detects this by the EMD system medium detector 524.

Also, the content recorded on an EMD system medium is recorded as encrypted EMD system content when recorded by EMD system hardware, while is recorded as unencrypted SCMS system content when recorded by SCMS system hardware. Namely, this means that one EMD system medium records a mixture of different types of content.

Accordingly, when reproducing content, it is necessary to discriminate the form of recording form.

Therefore, the EMD system 1 records the type of content in the TOC of each EMD system medium.

Specifically, the TOC comprises a flag set to 0 when the content is SCMS system content or 1 when it is EMD system content.

By this, when the system is switched in accordance with the TOC information, the EMD system hardware can suitably carry out the reproduction.

2. Examination of Ownership Rights

In an EMD system 1, even when copying is physically possible, copying is disabled or charged etc. in relation to the clearing of rights. Specifically, for copying of content data, it is necessary to discriminate if it is a copy free private recording or a personal transaction to be charged for.

Therefore, the owners of the recording medium and the hardware are examined so as to detect for example when one's own recording medium is mounted in hardware of another person.

Then, copying is restricted or charged for based on this.

3. Usage Space Examination for Distributing Profits

In an EMD system 1, the profit obtained by the distribution of the content data is distributed by a predetermined rate among the concerned parties related to the distribution in the EMD service center 100. Further, sometimes the concerned parties include for example manufacturers of the apparatuses and persons having rights for specific processing such as the compression and encoding method. Accordingly, from the viewpoint of distribution of profits, it is necessary to examine and grasp all of the concerned parties.

4. Usage Space Examination Concerning Format Conversion Coefficient

In the EMD system 1, due to the handling of content data of various signal parameters, it is sometimes necessary to convert the signal parameters such as a convert the rate when copying etc. Then, when charging, it is necessary to consider deterioration of the signal based on such conversion. Namely, it is preferable to set copies accompanied with deterioration of the quality cheap and set copies made at a high quality at a high price.

Therefore, these signal parameters are examined at the time of copying or the like and considered at the time of charging.

Also, examination relating to the conversion of signal parameters is also necessary for control of the processing for actual conversion of the signal.

Usage Space Examination Procedure

Then, when copying as shown in for example FIG. 14, a usage space examination is performed by the following procedure.

First, the reproduction side examines the usage space between the medium and the hardware.

For this purpose, first, the media SAM of the recording medium on the reproduction side sends its own information to the reproduction apparatus.

Next, the reproduction apparatus creates the usage space descriptor in the SAM and sets the data of the usage space such as the signal processing handled by the apparatus described in the SAM of the apparatus of the reproduction side in the usage space descriptor.

Next, it sets the information of the medium in the usage space descriptor. That is, it authenticates between the medium and the hardware and transfers all of the secure data for which the session keys are held at the two sides and described in the media SAM to the SAM of the hardware.

Due to this, the usage space examination of the reproduction side ends.

Next, the recording side as well similarly examines the usage space between the recording apparatus and the recording medium.

Then, finally, by sending the result of the usage space examination of the recording apparatus side to the reproduction side, the usage space descriptor is completed in the SAM of the apparatus of the reproduction side.

The usage space descriptor created in this way (also referred to as the usage space table) is shown in FIG. 15.

Note that, here, a one-to-one correspondence between the reproduction side and the recording side is shown, but there are also cases of copying from one reproduction side with respect to a plurality of recording apparatuses.

In such a case, a usage space examination table as shown in FIG. 16 comprised of information similar to that shown in FIG. 15 is created.

Initial Operation Including Usage Space Examination

Next, an explanation will be given of an initial operation including processing for the usage space examination before the actual copying operation when copying music data from one package medium to another package medium as shown in for example FIG. 14 by referring to the flowcharts of FIG. 17 to FIG. 24.

Figure 17:
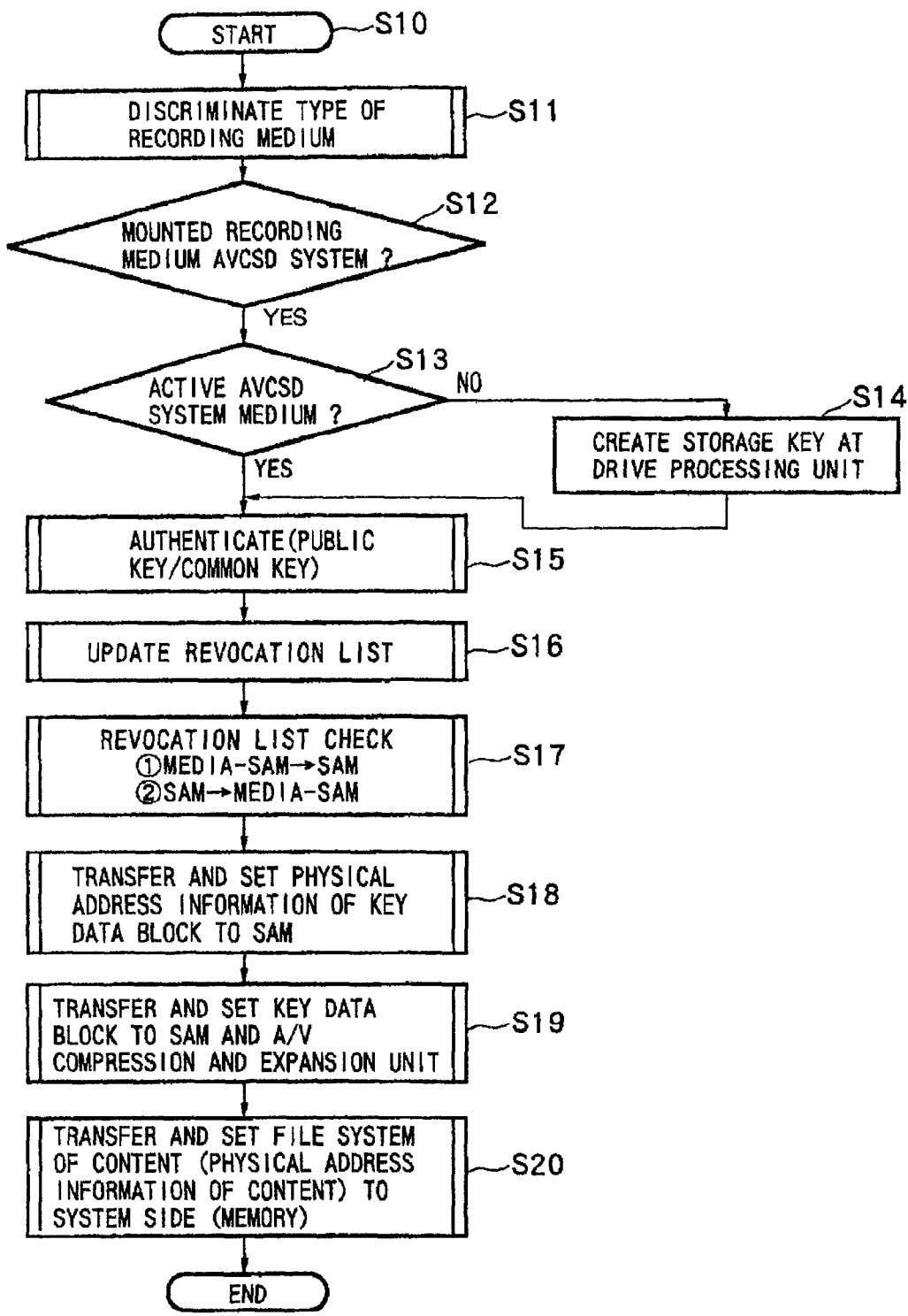
FIG. 17 is a flowchart of a flow of a series of initial processing including the usage space examination.
Figure 18:
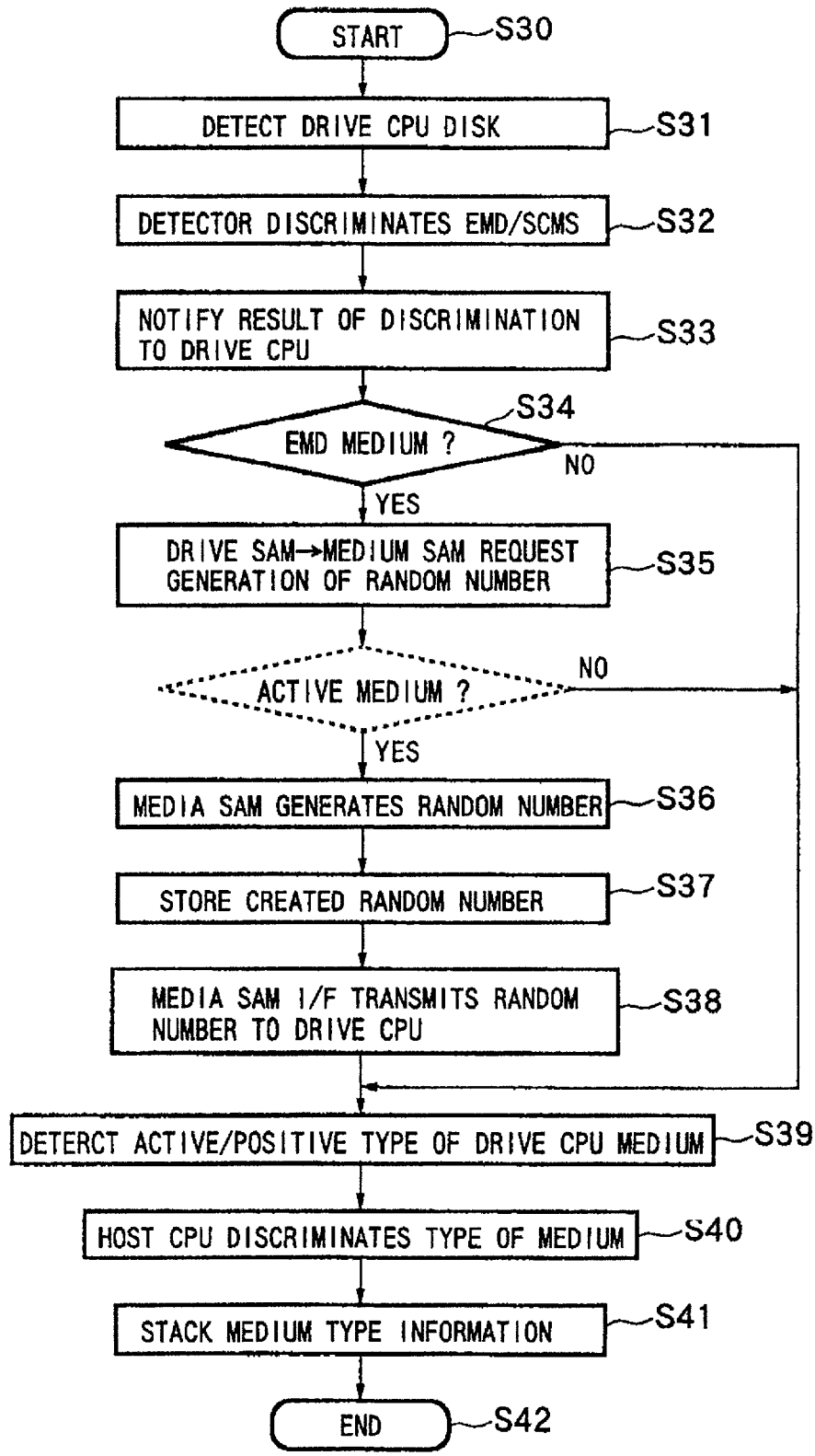
FIG. 18 is a flowchart of a flow of processing for discrimination of the type of a mounted recording medium.

First, an explanation will be given of the flow of the entire processing of this initial operation by referring to the flowchart of FIG. 17.

First of all, the type of the mounted recording medium is discriminated (step S11). When the mounted recording medium is an EMD system medium (step S12), it is further inspected whether the medium is an active medium having an SAM and capable of creating a storage key by itself (step S13). When the recording medium is a medium not having an SAM, the storage key is created by the drive LSI 528 (step S14).

Next, the recording medium and the drive CPU 520 are authenticated by a public key method when the recording medium is an active medium, while by a common key method when the recording medium is a positive medium (step S15). (The following explanation will be given assuming that the recording medium is an active medium 710.)

Next, processing for updating the revocation list recorded on the recording medium is carried out (step S16). When the update is finished, first a revocation check is made from the media SAM 610 with respect to the SAM 600, then a revocation check is made to the SAM 600 to media SAM 610 (step S17).

Then, the physical address information of a key data block is transferred to and set in the SAM (step S18). Further, the key data block is transferred to the SAM 600 and an AV compression and expansion unit (step S19). Finally, the file system is transferred to the system memory 512 (step S20), then the series of initial processings before the transfer of the content data including the usage space examination is terminated (step S21).

Below, a detailed explanation will be given of the processing.

Figure 19:
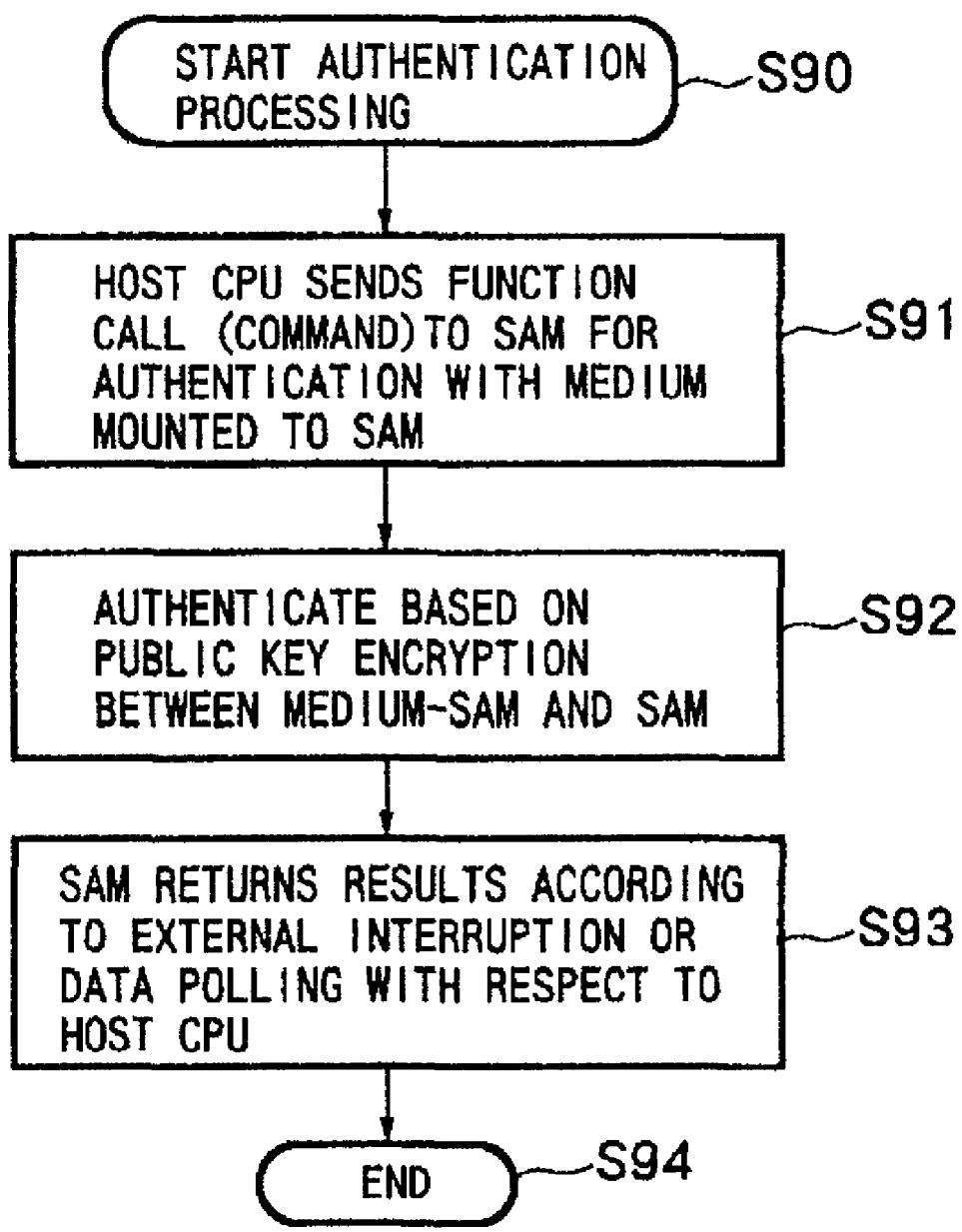
FIG. 19 is a flowchart of a flow of processing for mutual authentication.

First, an explanation will be given of the processing for discrimination of the type of the recording medium of step S11 by referring to the flowchart of FIG. 19.

First, for example the medium detection switch 526 starts the processing by detecting the insertion of the recording medium 710 etc. (step S30), then the medium detection switch 526 notifies this to the drive CPU 520 (step S31). Also, the EMD system medium detector 524 detects the state at the manual switch 712 of the recording medium 710 (step S32) and notifies the result of discrimination of the recording medium 710 to the drive CPU 520 (step S33).

Then, when the recording medium 710 is an EMD system medium (step S34), the drive CPU 520 requests the generation of a random number via the media SAM I/F522 with respect to the media SAM 610 of the recording medium 710 (step S35).

Due to this, if the recording medium 710 is an active recording medium having a media SAM 610, a random number is created at the media SAM 610 (step S67), the created random number is stored in a register via the media SAM I/F 522 (step S37), and the fact that a random number was stored is notified from the media SAM I/F 522 to the drive CPU 520(step S38).

Namely, according to existence of these operations, the drive CPU 520 can discriminate whether the recording medium is an active medium or positive medium (step S39).

Then, the drive CPU 520 notifies the host CPU 510 of the type of the recording medium mounted (step S40). Simultaneously, the SAM 600 stacks the type information of the recording medium (step S41), whereby the processing for discrimination of the type of the recording medium ends (step S42).

Next, an explanation will be given of the processing for authentication of step S15 by referring to the flowchart of FIG. 15.

First, when the processing is started (step S90), the host CPU 510 sends a function call to the SAM 600 for authentication with the recording medium 710 (step S91).

Based on this, authentication is performed based on the public key encryption between the media SAM 610 and the SAM 600 (step S92). Then, the SAM 600 notifies the result to the host CPU 510 (step S93), whereby the mutual authentication is ended (step S94).

Figure 20:
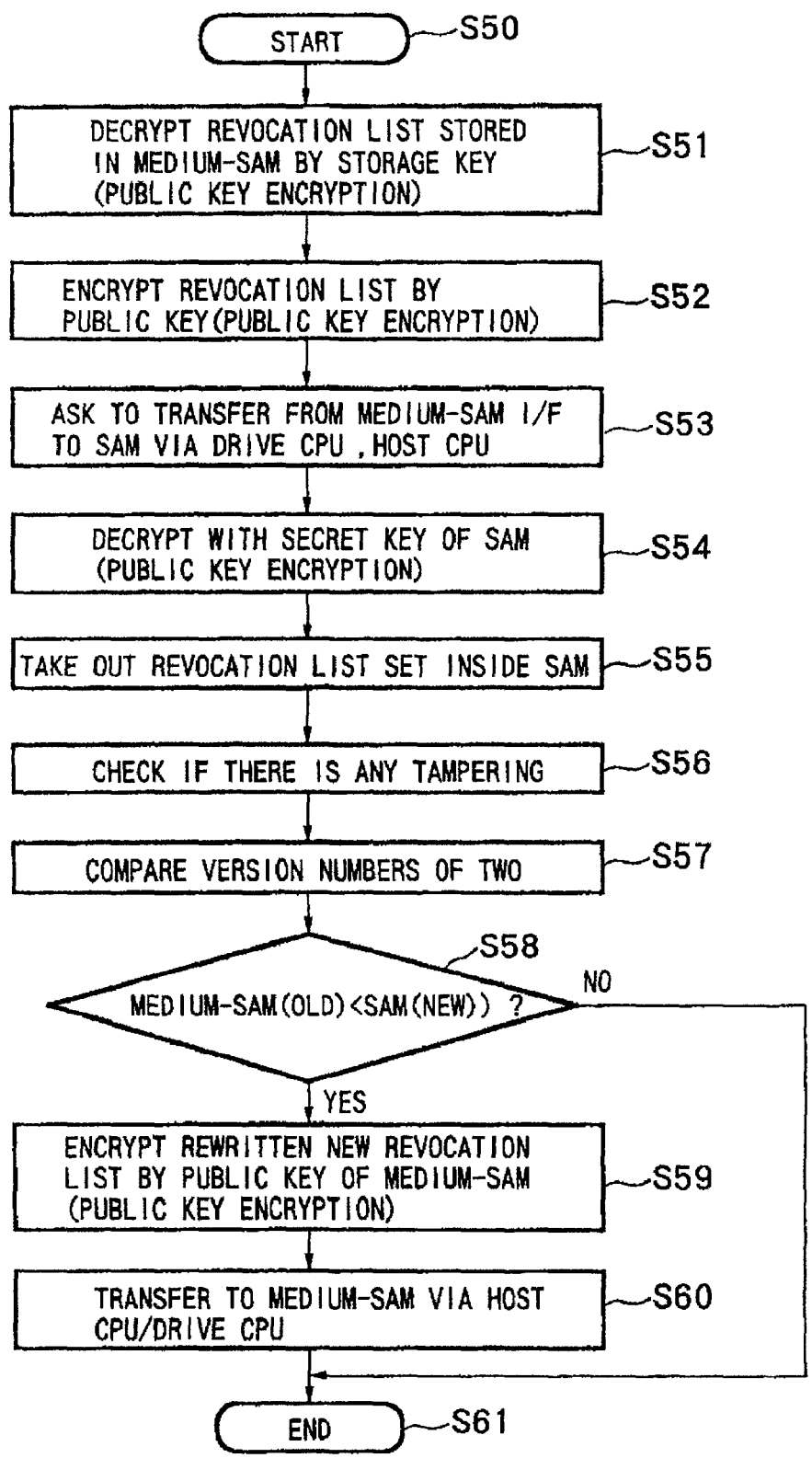
FIG. 20 is a flowchart of a flow of processing for updating a revocation list.

Next, an explanation will be given of the updating of the revocation list of step S16 by referring to the flowchart of FIG. 20.

First, when the processing is started (step S50), the revocation list stored in the media SAM 610 is decrypted by the storage key (step S51).

Next, the revocation list is encrypted by the public key of the SAM 600 (step S52), then it is transferred to the SAM 600 via the media SAM I/F 522, the drive CPU 520, and the host CPU 510 (step S53).

The transferred revocation list is decrypted in the SAM 600 by using the secret key of the SAM 600 (step S54).

Then, the revocation list stored in the SAM 600 is read out (step S55), decrypted by a MAC key, and compared with a MAC value stored in the SAM 600 to check that there has been no tampering (step S56).

Then, the version numbers of the revocation list read out from the recording medium 710 and the revocation list stored in the SAM 600 are compared (step S57). If the revocation list stored in the SAM 600 is newer (step S58), this revocation list is encrypted by the public key of the media SAM 610 (step S59) and transferred to a media SAM 610 via the host CPU 510, the drive CPU 520, and the media SAM I/F 522 (step S60), whereby the revocation list of the media SAM 610 is updated and the processing ended (step S61).

Figure 21:
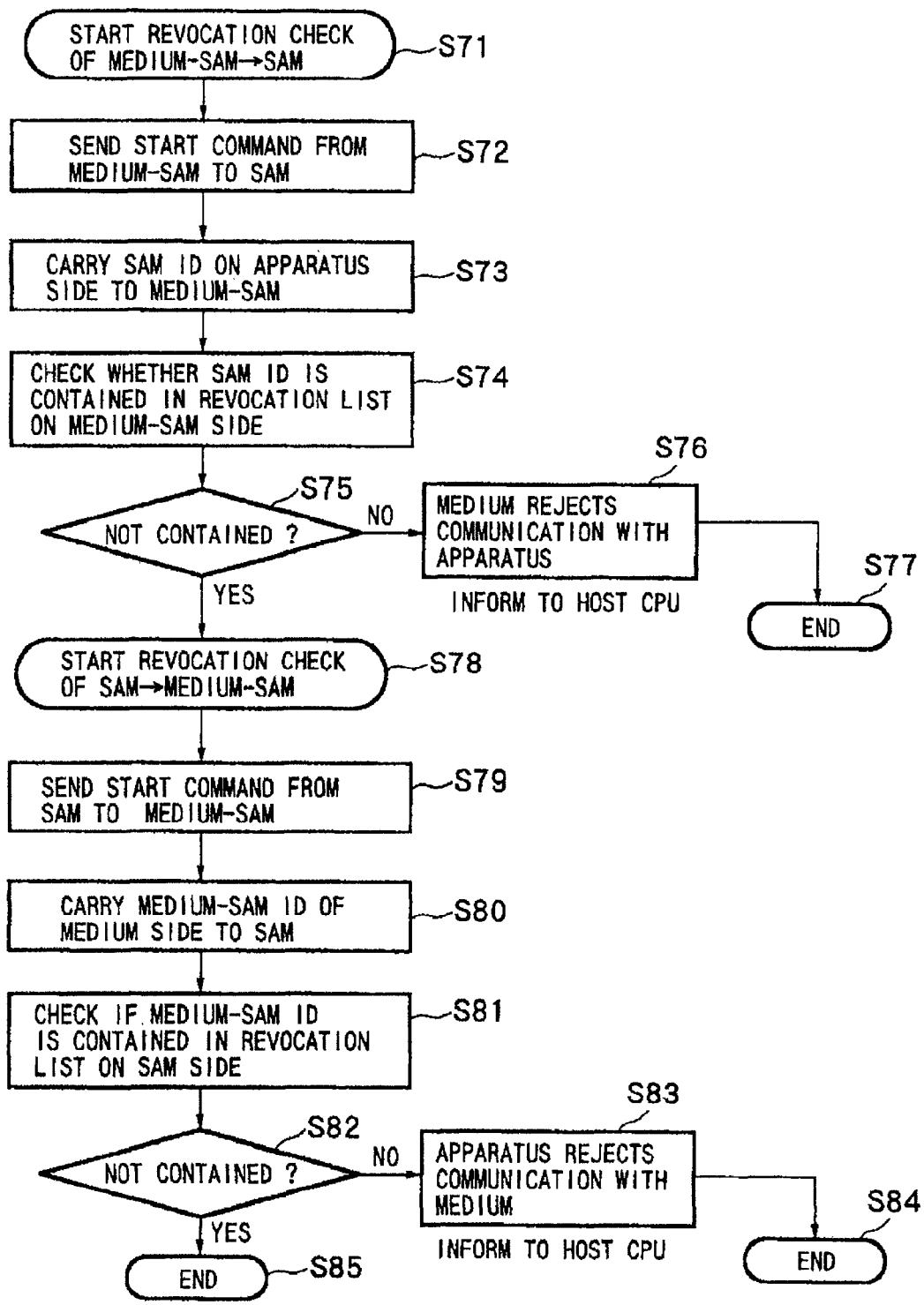
FIG. 21 is a flowchart of a flow of processing for checking a revocation list.

Next, an explanation will be given of the processing for checking the revocation list of step S17 by referring to the flowchart of FIG. 21.

First, when the processing for the checking is started (step S71), by sending a command from the media SAM 610 to the SAM 600 (step S72), the ID of the SAM 600 is transferred to the media SAM 610 (step S73).

The media SAM 610 checks whether or not this ID is contained in the revocation list. When it is contained therein, the apparatus having this SAM 600 is decided to be an unsuitable apparatus, for example, one for which some sort of illegitimate action has been performed. The media SAM 610 rejects the communication with the recording and reproducing apparatus 414 (step S76) and ends the processing (step S77).

When the ID of the SAM 600 is not contained in the revocation list (step S75), next the check from the SAM 600 to the media SAM 610 is started (step S78), a command is sent from the SAM 600 to the media SAM 610 (step S79), and the ID of the media SAM 610 is transferred to the SAM 600 (step S80).

The SAM 600 checks whether or not this ID is contained in the revocation list. When it is contained, it decides that this recording medium 710 is an unsuitable recording medium 710 for which for example some sort of illegitimate action has been performed, rejects the following communication (step S83), and ends the processing.

When the ID of the media SAM 610 is not contained in the revocation list (step S82), it is decided that both of the SAM 600 and the media SAM 610 are proper SAMs, that is, both of the recording and reproducing apparatus 414 and the recording medium 710 are a proper apparatus and medium, and the series of check processings is ended (step S85).

Figure 22:
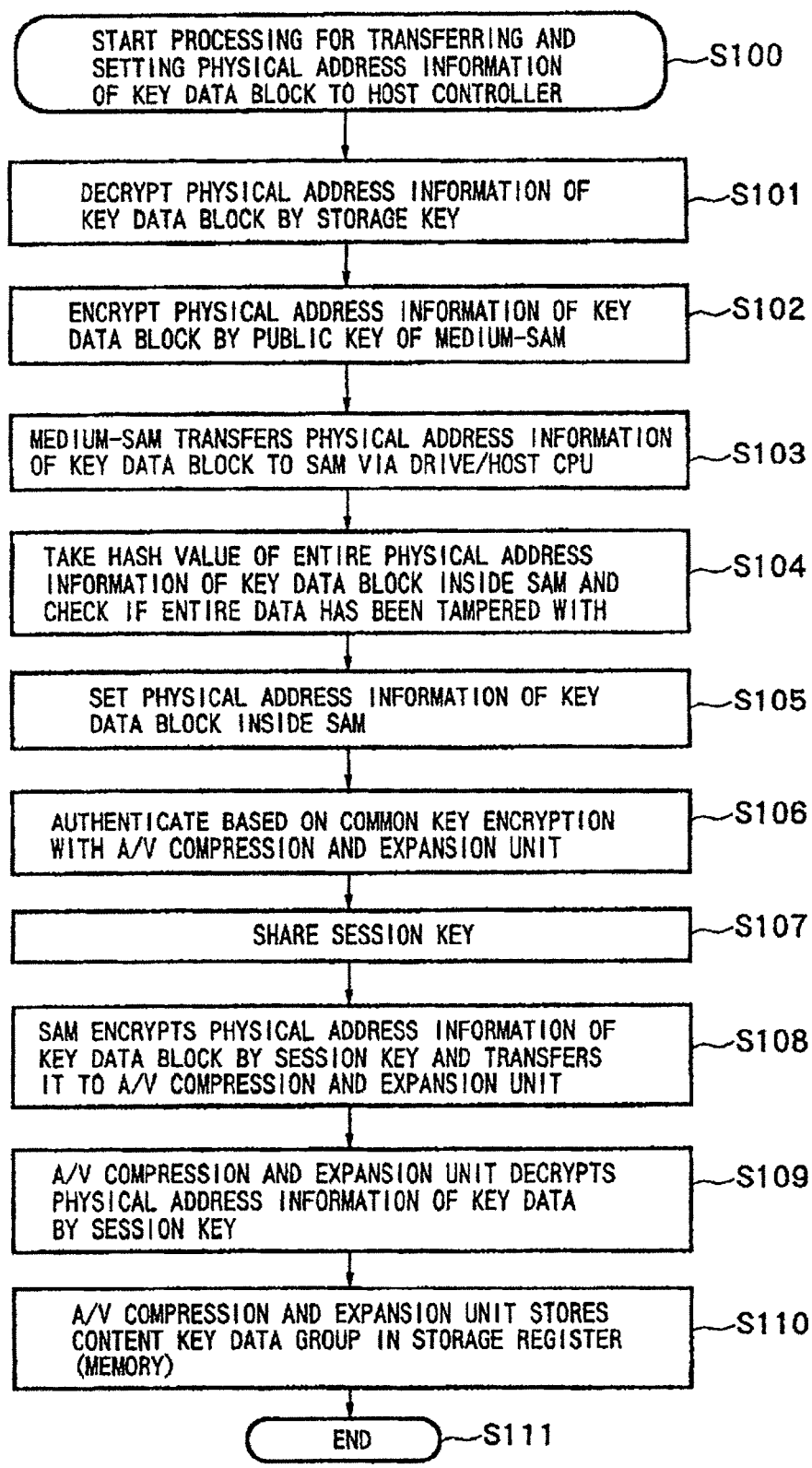
FIG. 22 is a flowchart of a flow of processing for transfer of physical address information of a key data block to a host controller.

Next, an explanation will be given of the transfer of the physical address information of the key data block to the host controller at step S11 by referring to the flowchart of FIG. 22.

First, when the processing is started (step S100), the information of the physical address of the key data block is decrypted by the storage key (step S101), and the physical address information of the key data block is encrypted by the public key of the media SAM 610 (step S102).

Then, the media SAM 610 transfers this encrypted information via the media SAM I/F 522, drive CPU 520, and the host CPU 510 to the SAM 600 (step S103).

In the SAM 600, the hash value of the entire physical address information of the key data block is taken, it is checked if the entire data has been tampered with (step S104), and the physical address information is set in the SAM 600 if it is proper (step S105).

Next, authentication based on the AV codec SAM 620 and the common key encryption is carried out (step S106), the session key is shared (step S107), and the key data block information is transferred to the AV codec SAM 620 (step S108).

The AV codec SAM 620 decrypts this by using the session key (step S109), stores the key data in the memory (step S110), and ends the series of transfer processing (step S111).

Figure 23:
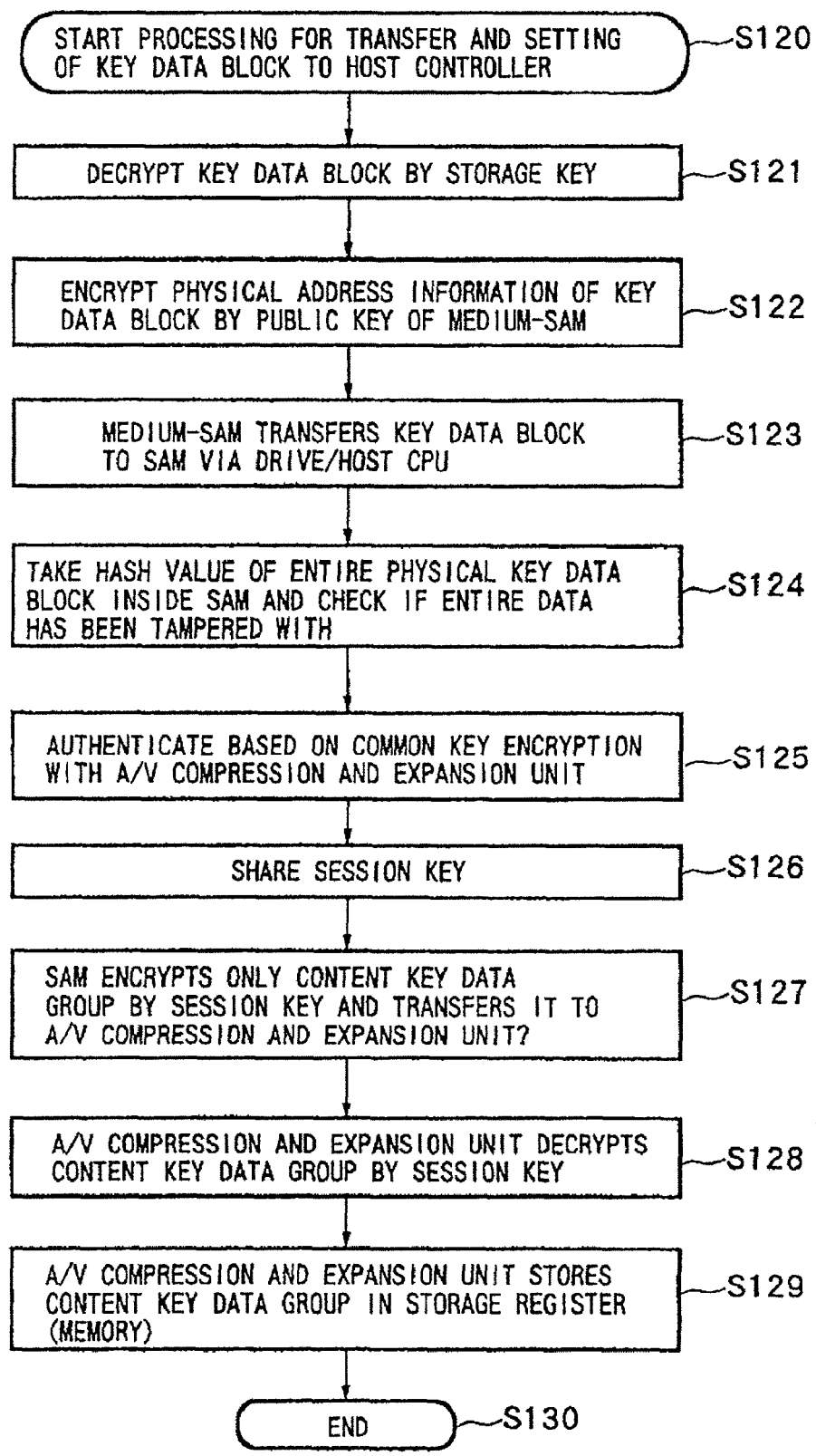
FIG. 23 is a flowchart of a flow of processing for transfer of a key data block to a host controller.

Next, an explanation will be given of the transfer of the key data block to the host controller at step S19 by referring to the flowchart of FIG. 23.

First, when the processing is started (step S120), the key data block is decrypted by the storage key (step S121), and the key data block is encrypted by the public key of the media SAM 610 (step S122).

Then, the media SAM 610 transfers this encrypted information via the media SAM I/F 522, the drive CPU 520, and the host CPU 510 to the SAM 600 (step S123).

The SAM 600 obtains the hash value of the entire key data block and checks if the entire data has been tampered with (step S124).

When it is proper, authentication based on the common key encryption is carried out with the AV codec SAM 620 (step S125), the session key is shared (step S126), and the key data block is transferred to the AV codec SAM 620 (step S127).

The AV codec SAM 620 decrypts this by using the session key (step S128), stores the key data in the memory (step S129), and ends the series of transfer processing (step S130).

Figure 24:
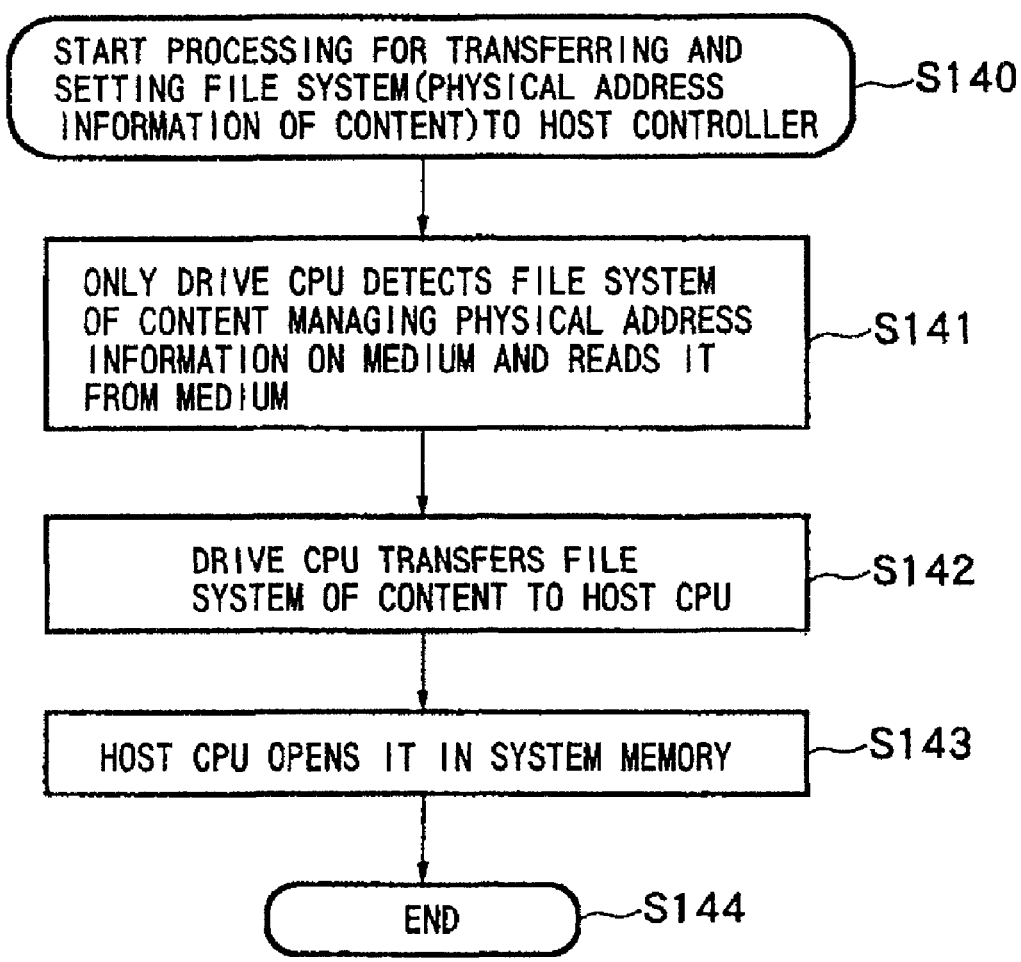
FIG. 24 is a flowchart of a flow of processing for transfer of a file system to a host controller.

Then, finally, an explanation will be given of the transfer of the file system to the host controller shown in step S20 by referring to the flowchart of FIG. 24.

First, when the processing is started (step S140), the drive CPU 520 detects the file system of the content file managing the physical address information on the recording medium 710 and reads this from the recording medium 710 (step S141).

Next, the drive CPU 520 transfers this file system to the host CPU 510 (step S142), the host CPU 510 stores this on the system memory 512 (step S143), and the transfer of the file system is ended (step S144).

Distribution Operation Finally, an explanation will be given of the flow of the data and the state of the distribution of data in various types of home network apparatuses by referring to FIG. 25 to FIG. 39 together.

Figure 25:
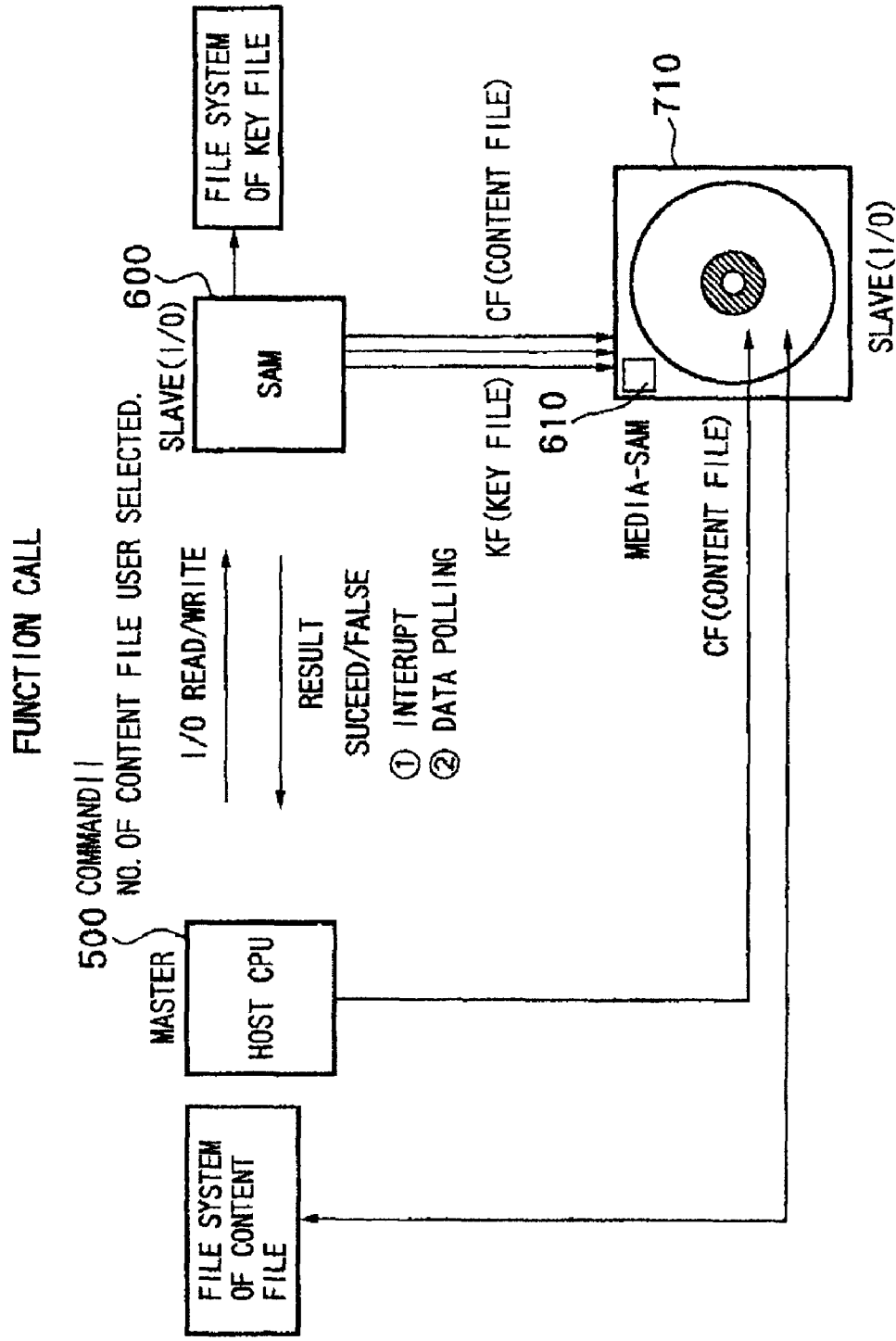
FIG. 25 is a view of a fundamental configuration of a host CPU, SAM, and medium of a home network apparatus.

First, the relationships among the host CPU 500 and SAM 600 and medium 710 of the apparatus are shown in FIG. 25. As explained above, the SAM 600 is connected to the host as the I/O and controlled by an I/O command.

The SAM 600 becomes slaved with respect to the host CPU 500, while the SAM becomes a master and the medium becomes the slave between the SAM 600 and the medium 710.

The medium 710 is connected to the SAM 600 and advances the processing by the function call and the result. A function call is information containing a command and a number for specifying the content.

The key file is processed by the medium and SAM, while the content file is sometimes processed by the SAM and sometimes recorded by the host CPU.

As the file system, the file system of the key file is opened in the SAM and opened in the host CPU of the content file.

Figure 26:
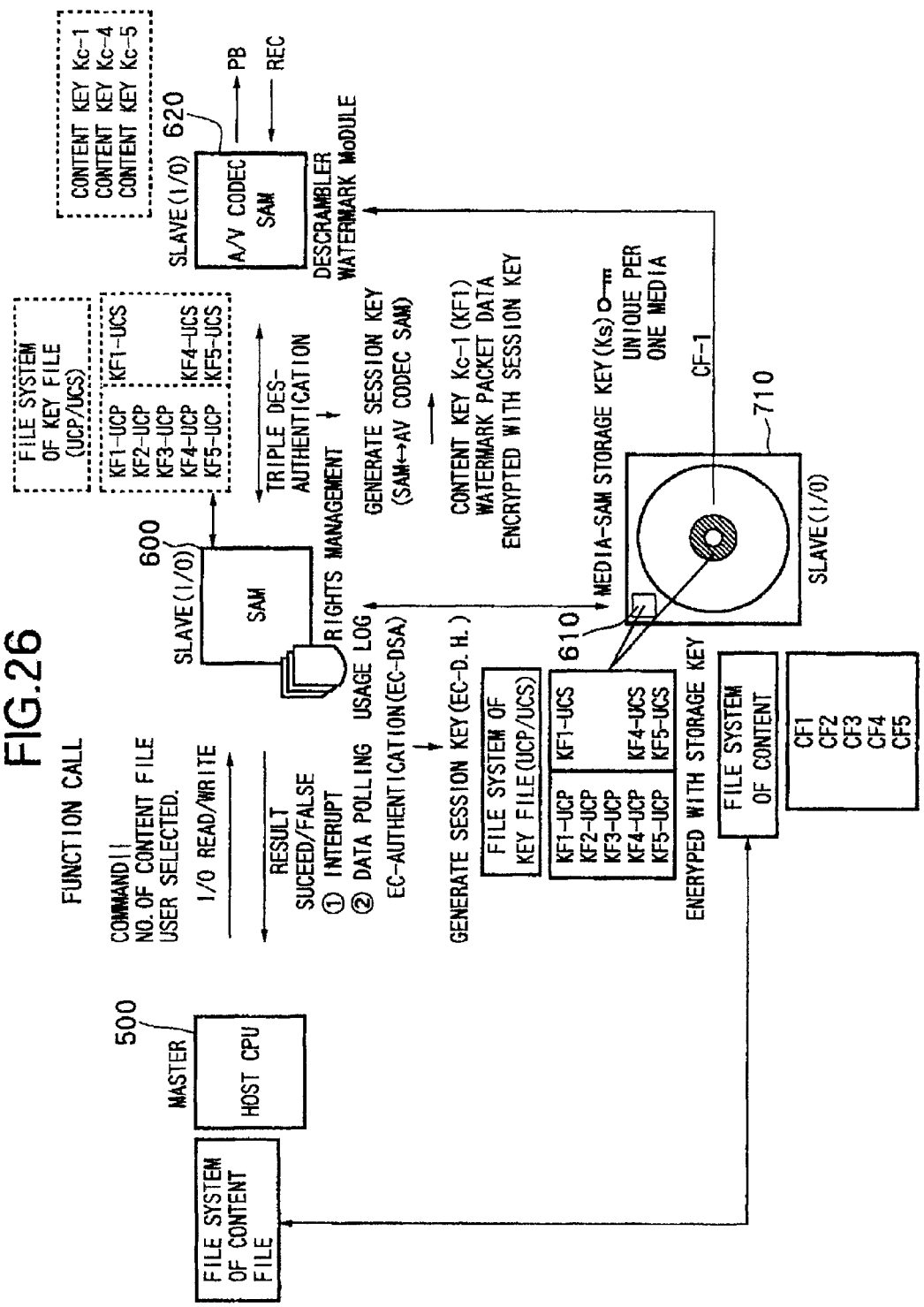
FIG. 26 is a view of relationships among the host CPU, SAM, AV codec SAM, and medium in the apparatus having the AV codec.

FIG. 26 is a view of the relationships among the host CPU, SAM, AV codec SAM, and the medium in an apparatus having an AV codec.

In this type of apparatus, at the point of time when the medium is inserted, the key files are opened in the SAM together and transferred to the medium together at the time of ejection including also the newly added key data.

In this case, authentication based on the public key method is carried out between the media SAM and the SAM to create the session key, the session is carried out, and the key file and the key file TOC are stocked on the SAM side.

As the content file, the file system is sent to the host CPU side. When the host CPU reads the file system by this and instructs to send a specific content file to the codec SAM, the SAM and the AV codec SAM perform authentication by triple DES to create the session key and thereby transfer the content key of the intended content, for example, the content 1, 4, and 5 from the SAM to the AV codec SAM.

Further, the watermark data for the analog output is encrypted by the session key and transferred to the AV codec SAM.

By this, the compressed data reproduced from the medium is decrypted in real time at the AV codec SAM, added with the watermark, and output.

Figure 27:
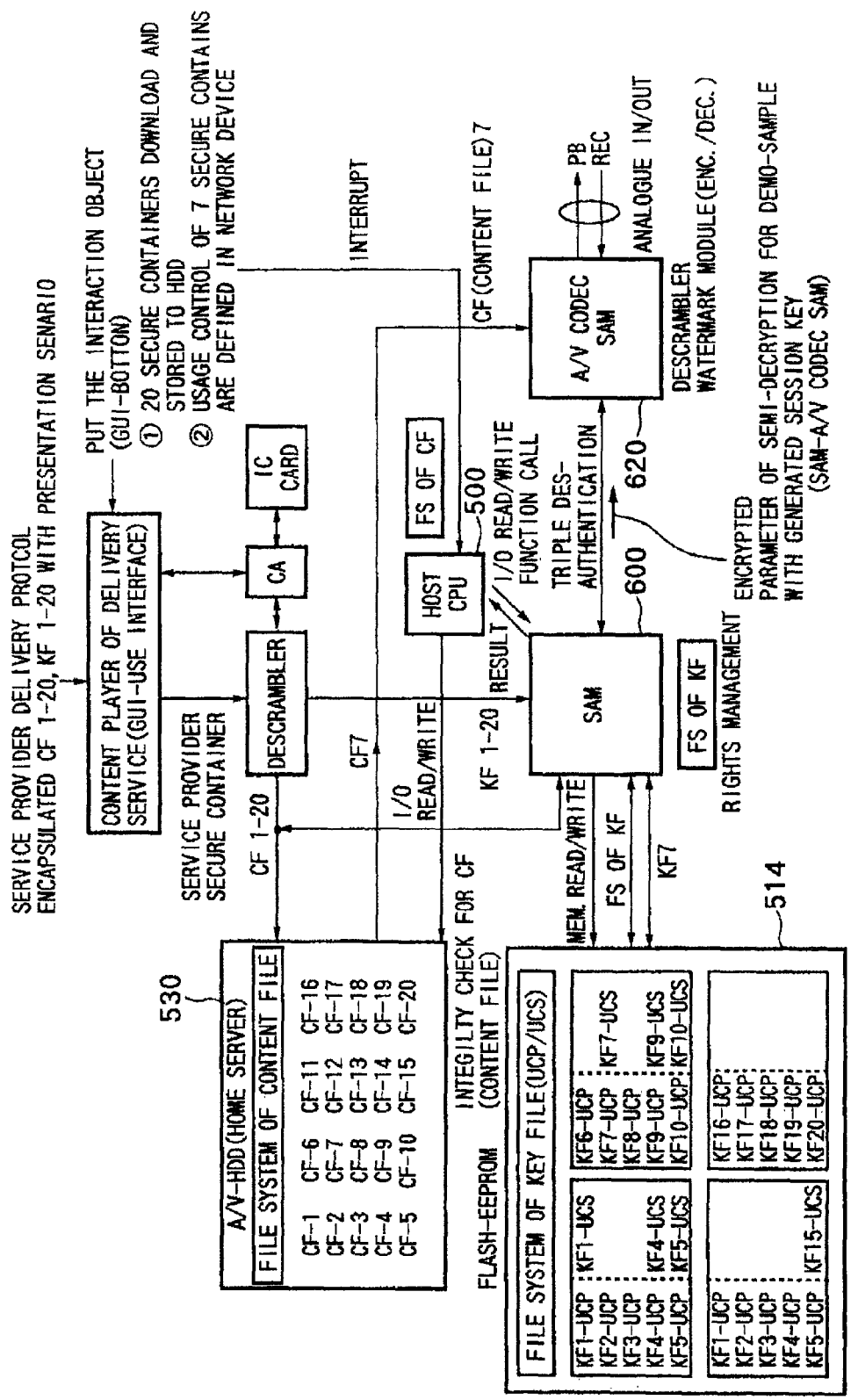
FIG. 27 is a view of a state which an encrypted content file is downloaded on a hard disk, listened to on a trial basis, and determined in type of usage.

FIG. 27 is a view for explaining the process of the content file encrypted on the hard disk being downloaded via a conditional access (CA), this is listened to on a trial basis and reproduced, then the type of usage is determined.

In this apparatus, the conditional access (CA) downloads 20 content files of for example CF-1 to CF-20 by a delivery service. Then, the content file is loaded on an AV hard disk 530, while the key file is loaded on the EEPROM 514 managed by the SAM.

The authentication is carried out by the SAM and the AV codec SAM by the triple DES, while the key file of the content to be reproduced is sent to the AV codec SAM and reproduced and output by the AV codec.

The host CPU sends the function call by the I/O read/write to the SAM and receives the result.

Also, it instructs the HDD by the I/O read/write and reads for example the content 7 to output the same to the AV codec.

The SAM stacks the file systems based on the file system by the memory read write and sends the same to the content key AV codec.

By pressing a button by a GUI, the host is interrupted and the download is started. When the download is started, the host asks the SAM to store the key file.

Figure 28:
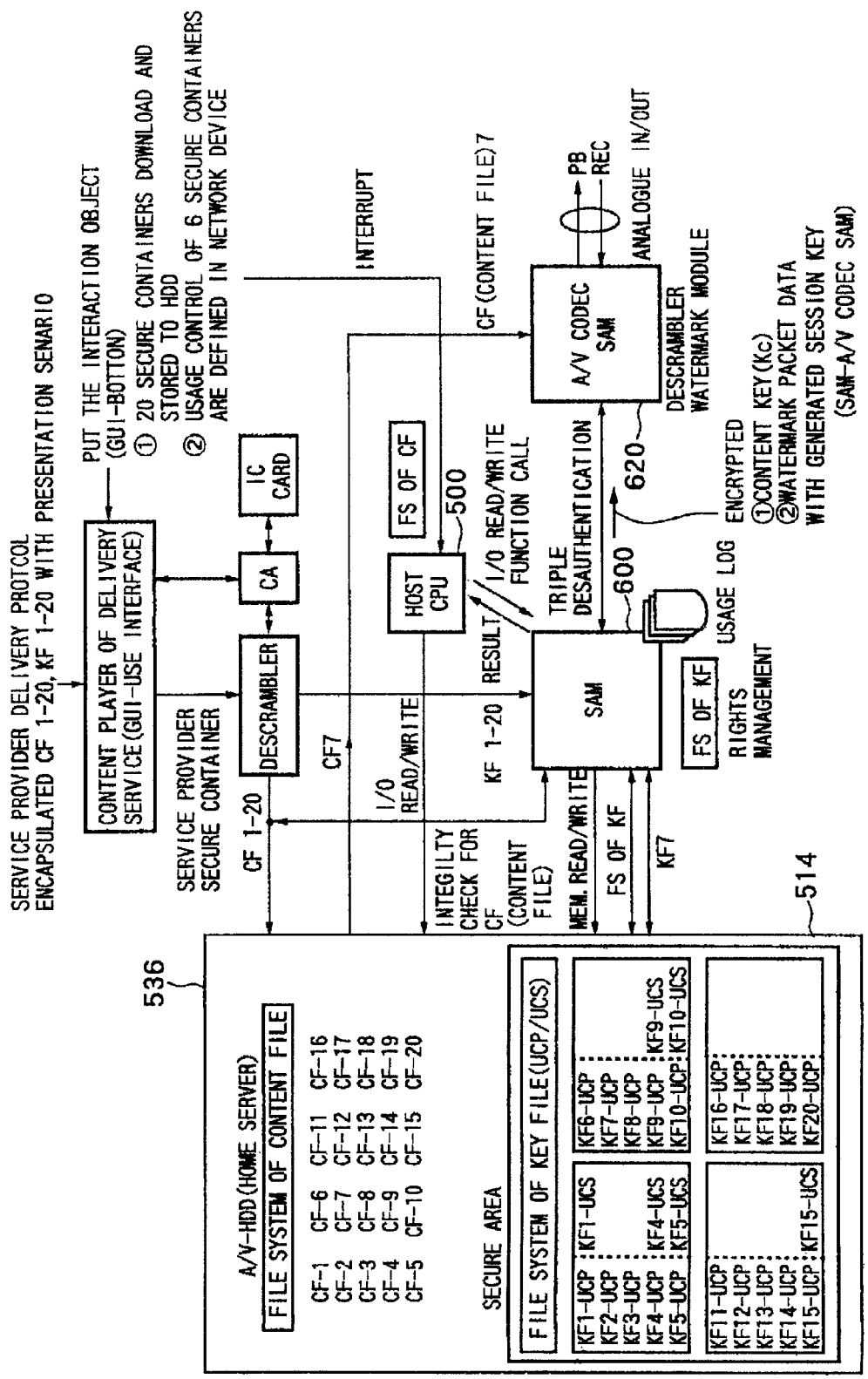
FIG. 28 is a view of a case that there is a secure region in the hard disk.

FIG. 28 is a view of a case that there is a secure region in the hard disk. In this case, the key file is entered in the hard disk, and the HDD becomes storage space shared by the host and SAM.

Only the SAM can access the key file stored in the HDD. The file system of the key file is stacked by the SAM, while the file system of the content file is stacked by the host CPU.

Figure 29:
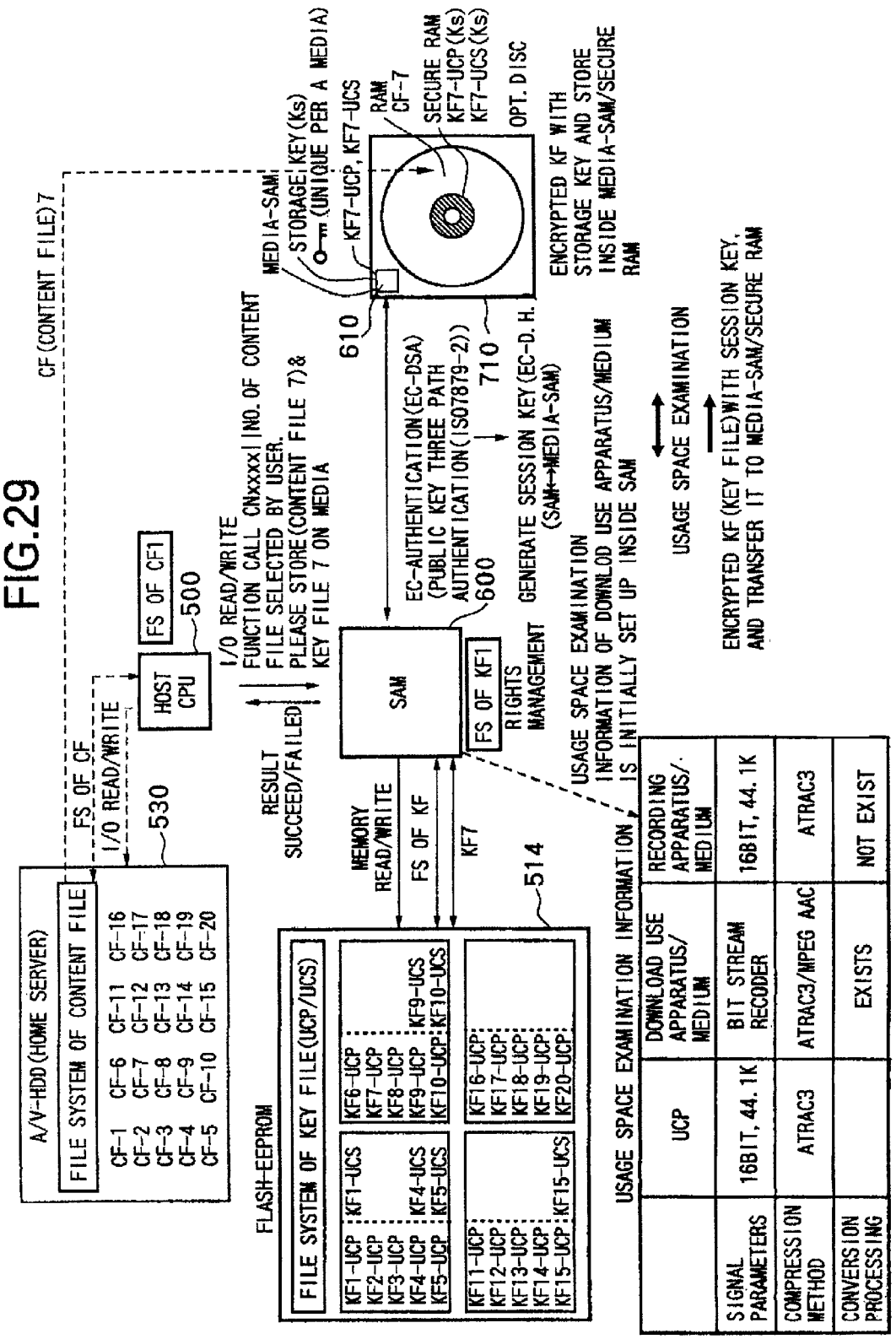
FIG. 29 is a view of a case that a package medium is in the network apparatus.

FIG. 29 is a view of a case that a package medium is introduced into the network apparatus.

In this case, the SAM and the media SAM authenticate each other and send the key file to the media SAM by the session key. Then, the media SAM side unlocks the session key, encrypts it by the storage key, changes the key, and records it on the media SAM. The SAM returns an OK to the host, while the host records the content file on the medium by the I/O read/write.

At this time, the usage space is examined, and if necessary, the parameters converted and then recorded.

Figure 30:
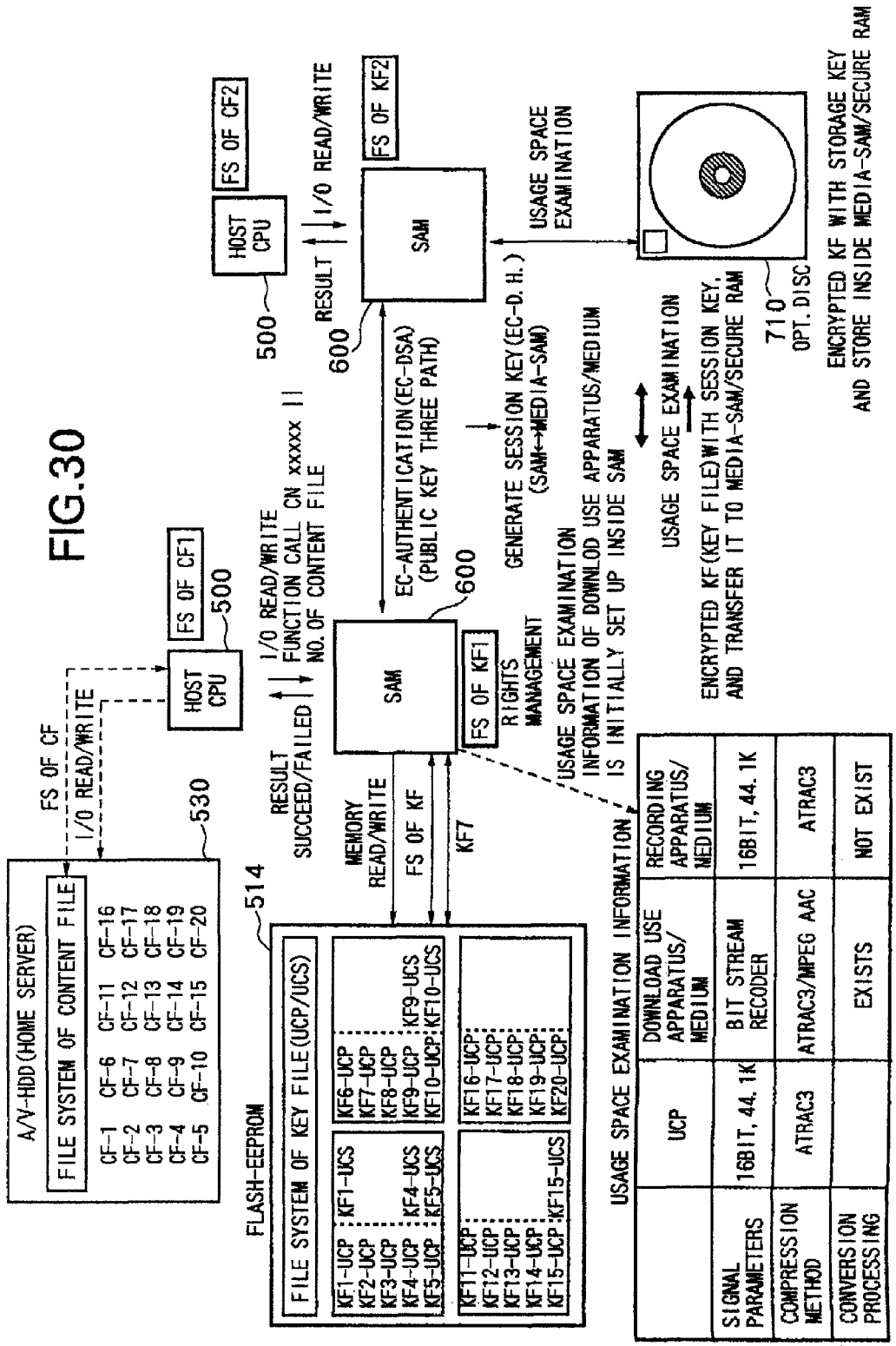
FIG. 30 is a view of copy processing by a configuration similar to the EMD system.

FIG. 30 is an example of the typical copying in the EMD system 1 in the same way as that shown in FIG. 14.

In this configuration, there is a package apparatus separate from the network apparatus. These are connected by a physical line for downloads. Accordingly, authentication between one SAM and another becomes necessary.

The authentication is carried out between the host and SAM of both apparatuses and between the SAM and SAM.

The reproduction side fetches the key file from the memory, authenticates between the SAM and SAM, creates a session key, and sends the key file to the recording side.

The recording side authenticates with the media SAM and opens the key file of the medium.

The type of purchase may be determined on the sender side or may be determined on the recording side.

The usage space examination is carried out by the apparatuses of both sides.

The host CPU on the reproduction side holds the file system of the content file recorded on the hard disk. The file system of the key file held by the SAM is the file system of the key file recorded in the memory.

The host CPU of the recording side is the file system of the content file recorded on the package medium, while the key file and the file system held by the SAM are those of the package medium.

Figure 31:
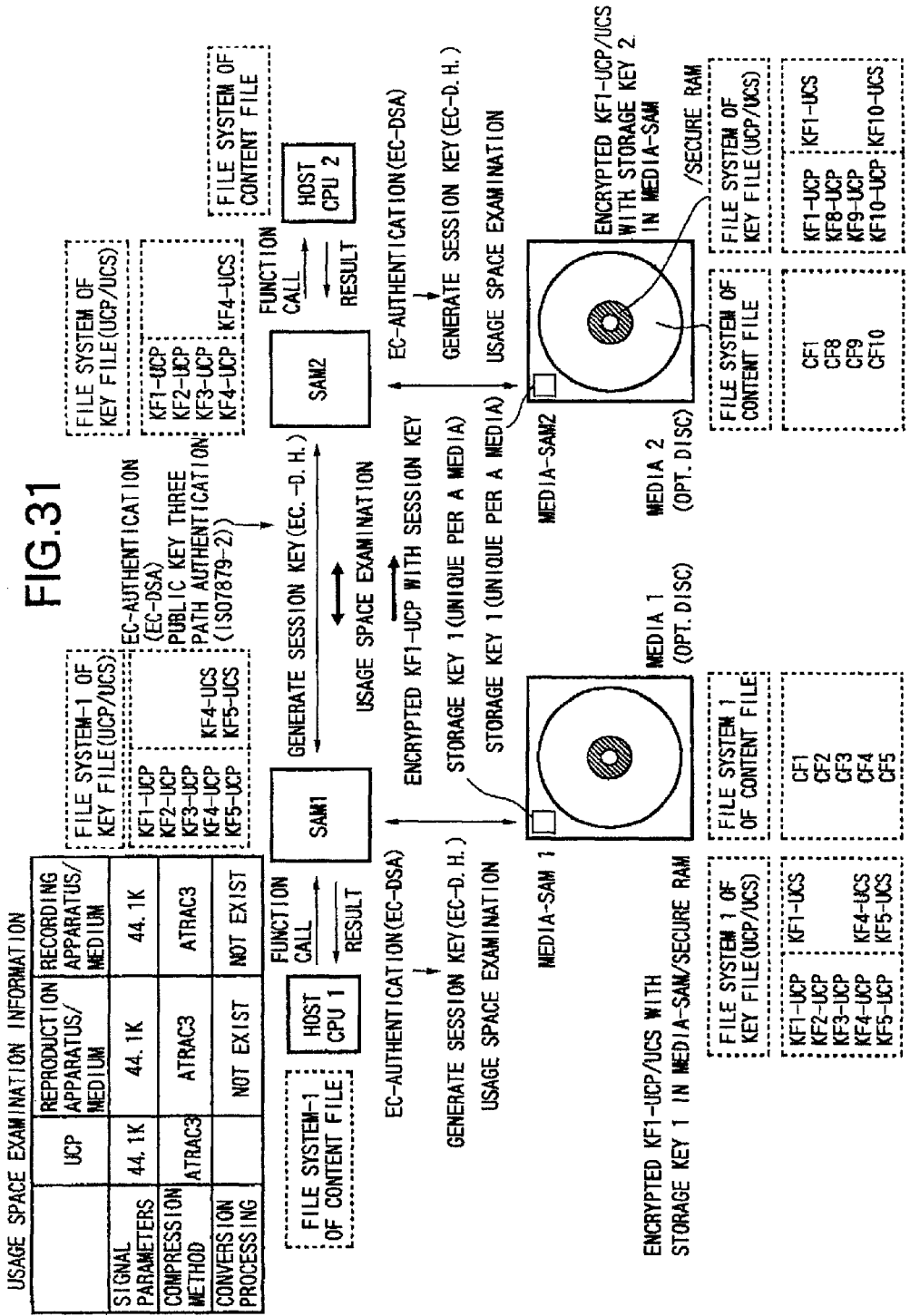
FIG. 31 is a view of a case of redistribution among packages.

FIG. 31 is a view of the case of redistribution among the packages.

The usage space examination is carried out between the reproduction apparatus and medium, the medium space examination is carried out by the SAM and the recording system, the key file is opened in the SAM, and the content file is opened in the HDD. As the type of usage, only the UCP is shifted.

Accordingly, a session key is formed, only the UCP and key file are transferred, and the content file is transferred as it is.

Authentication is carried out by the SAM and the media SAM, the key file is sent, and the content file is recorded on the medium.

The UCS is formed on the reproduction side, and the type of purchase is determined.

When it is transferred to the recording side, it is KF1-UCP, but when it is recorded on the medium, it becomes KF1-UCP/UCS.

Note that, in this case, it is assumed that the usage space examination shows that the parameters are the same.

Figure 32:
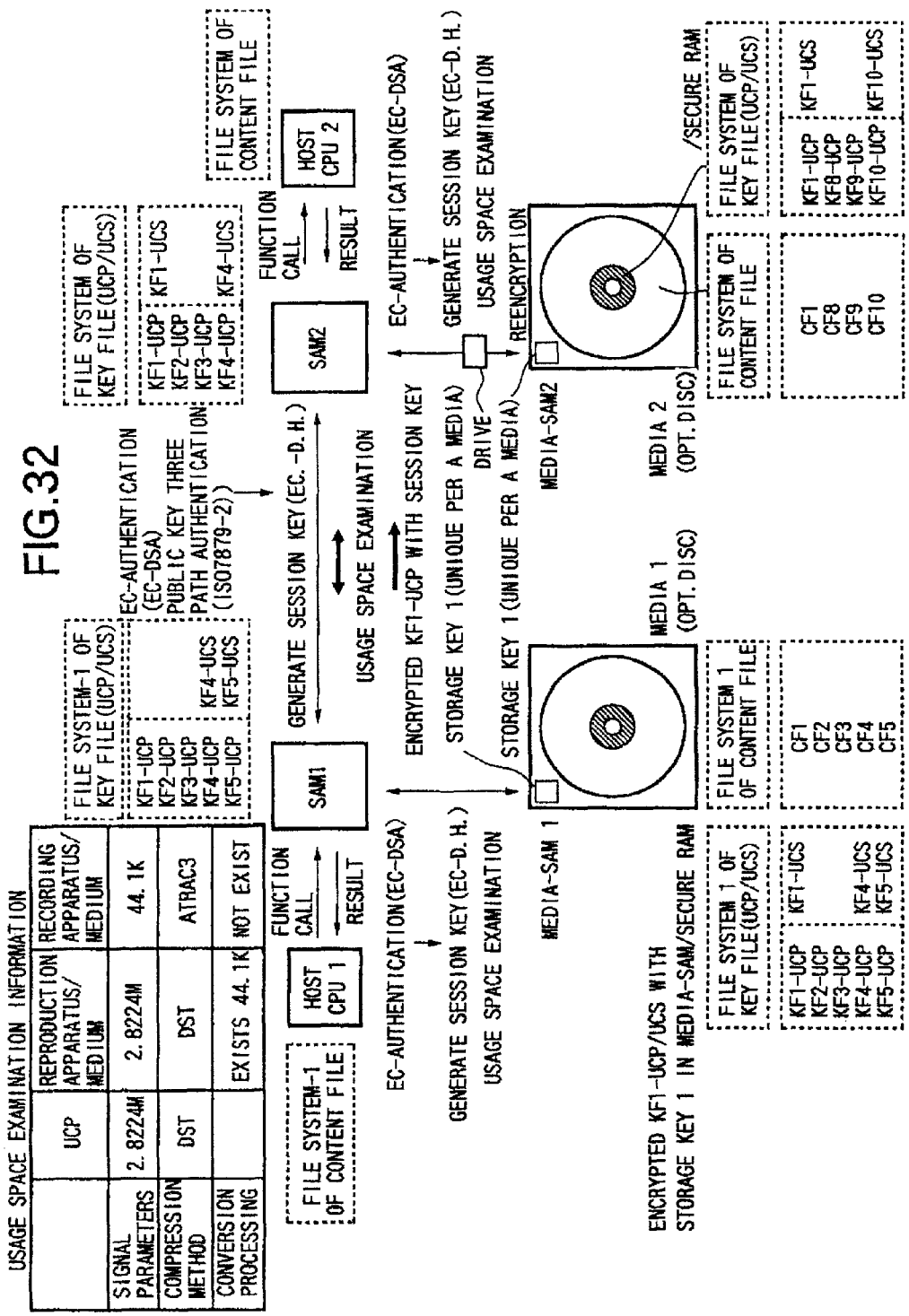
FIG. 32 is a view of an example of retransmission where parameters are different.

FIG. 32 is a view of an example of retransmission where the parameters are different.

While redistribution, the parameters are different. In this usage space, the reproduction side has conversion processing, so the content is decrypted by the content key and the content key is sent to the recording side by the session key.

Then, the signal is converted, sent by the session key, re-encrypted by the content key stacked on the recording side, and recorded on the medium.

The re-encryption is carried out by the drive. Since there is a DES in the drive, the content is recorded while being encrypted here.

Figure 33:
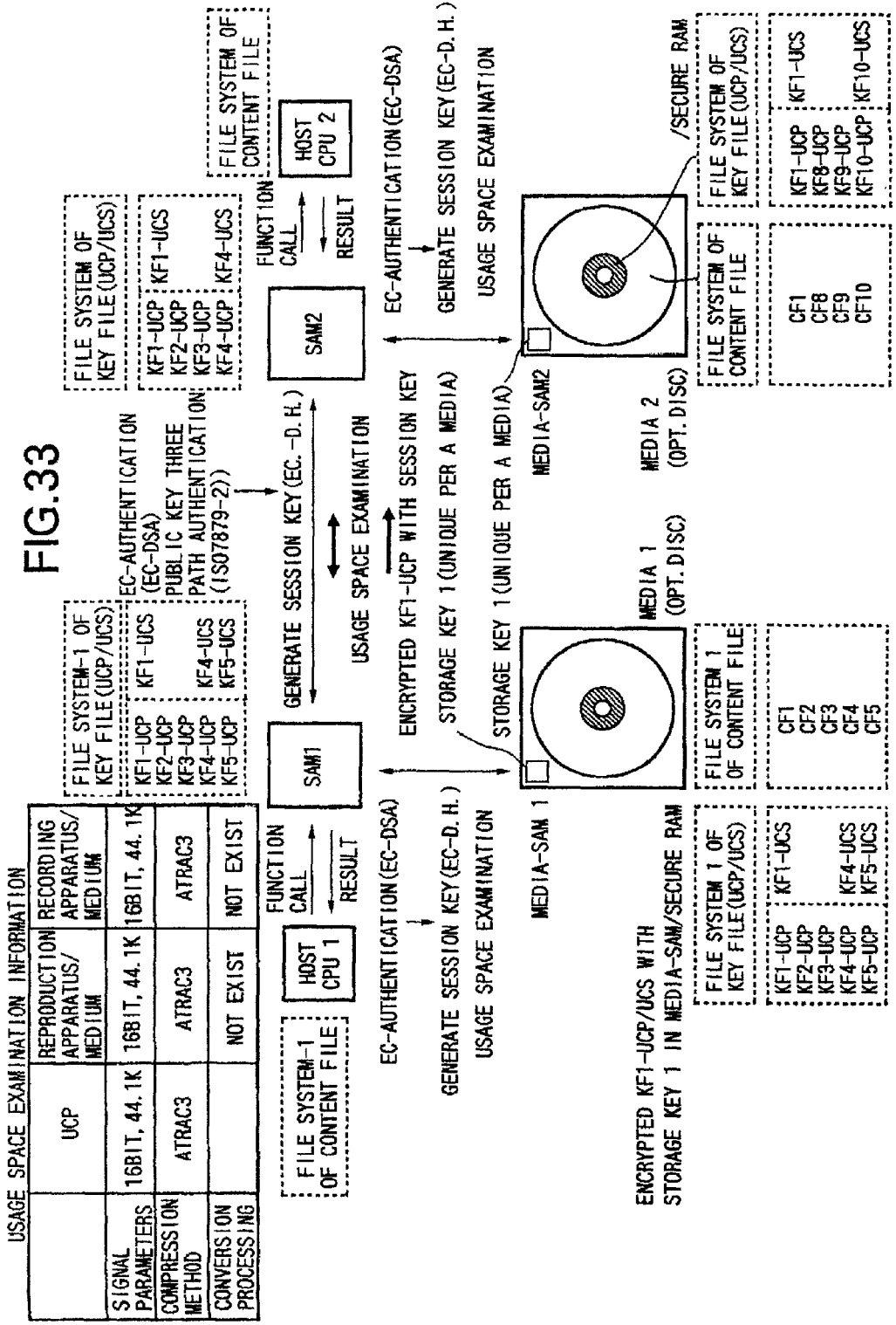
FIG. 33 is a view of an example of a purchase from the UCS.

FIG. 33 is a view of an example of purchase from the UCS.

It shows the case of a reproduction charge. The usage space examination and the operation for opening the key file are the same as the above case.

In this case, the parameters are the same, and the session key is possessed between the SAM and SAM, and between the SAM and the media SAM. Also, the key file of the UCS is sent by the session key.

Figure 34:
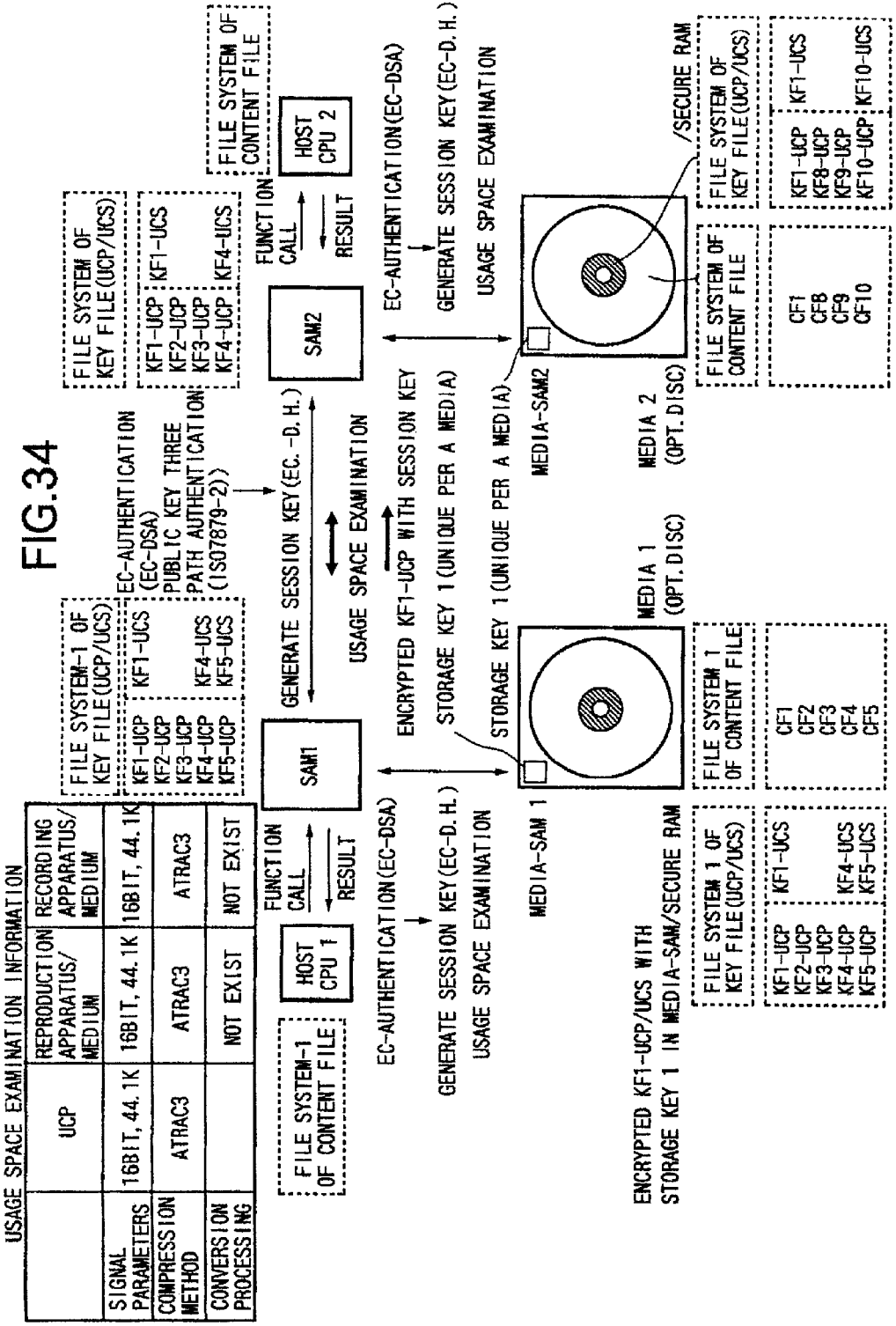

FIG. 34 is a view of a case of sell through.

By a discrimination of who purchased or who has the recording medium in the usage space examination, it is discriminate whether the copying is private recording or private usage/sale.

Also, usage space examination of the ownership rights is necessary. The content is transferred from the owner recorded in the UCS if the same as the owner of the recording medium, while is charged for in other cases.

Figure 35:
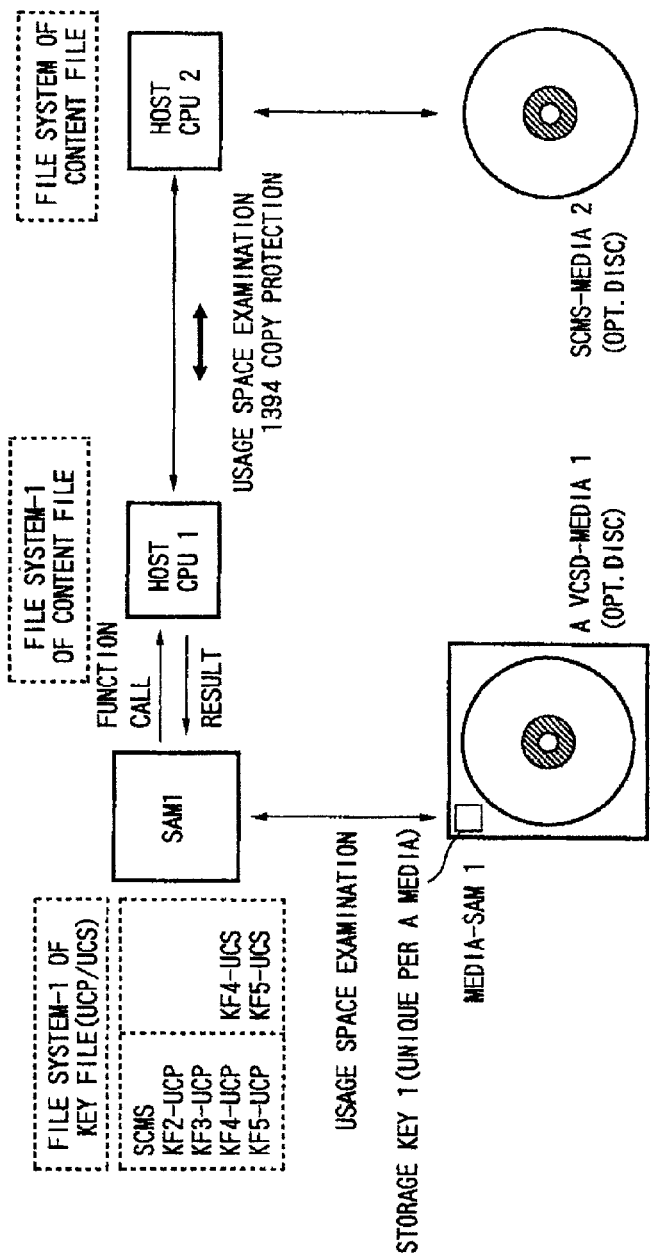
FIG. 35 is a view of copying from an EMD to SCMS content.

FIG. 35 is a view of copying from the EMD to the SCMS content.

Since the other party is found to be an SCMS by the usage space examination, a charge is levied at the SAM. The content is sent to the host CPU 2 and recorded on the medium by using the session key of a 1394 copy protection while releasing the encryption by the content key.

The protect mode at this time is a copy addition.

Figure 36:
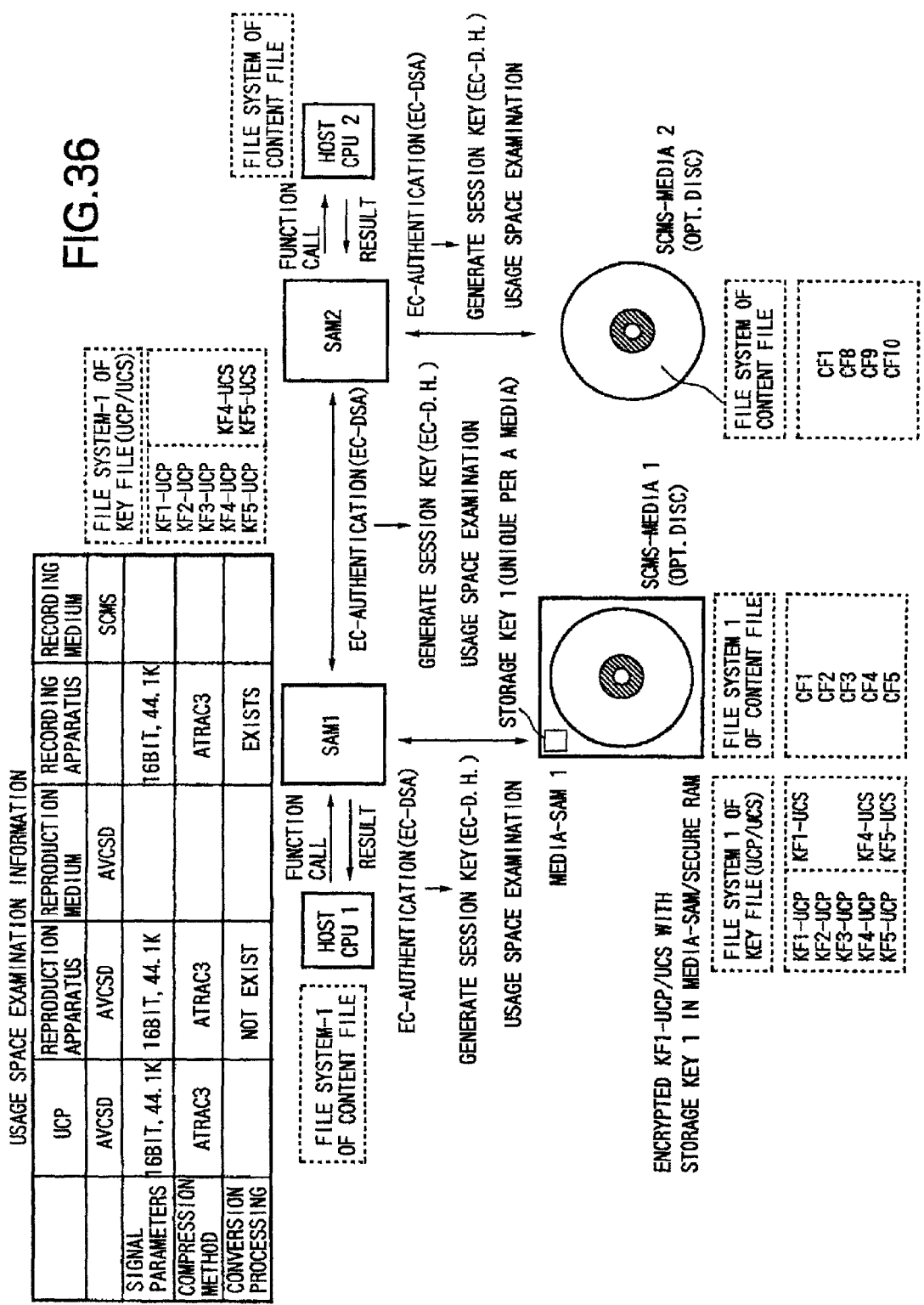
FIG. 36 is a view of a case that an SCMS apparatus is placed on an SAM apparatus by usage space examination.

FIG. 36 is a view of a case that the SCMS apparatus is placed in the SAM apparatus by the usage space examination.

While a session between the EMD apparatuses, since the medium placed on the storage side is an SCMS medium, the processing is carried out as the EMD mode and parameters written in the UCP and the SCMS of the recording medium of the other party.

In this case, the report of recording on the SCMS medium written in the UCP is viewed, the price of each copy is viewed, and this is paid by the reproduction side EMD apparatus. It is also possible to unlock the same by the content key on the reproduction side and transfer it and record the same by the session key, but it is also possible to record the same on the recording side.

Figure 37:
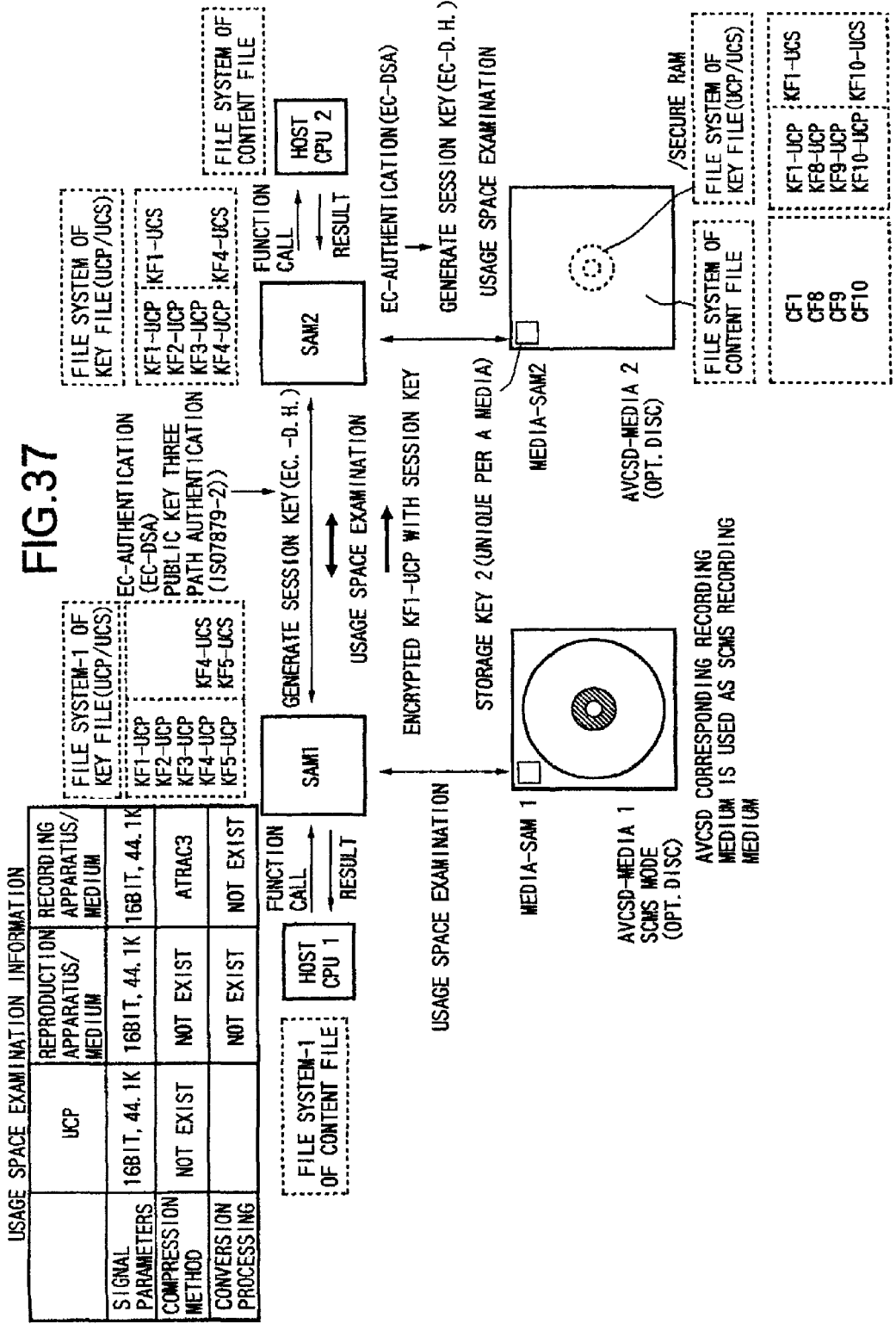
FIG. 37 is a view of a case that the reproduction side is an SAM apparatus and SAM medium, but used as an SCMS medium by a manual switch.

FIG. 37 is a case that the reproduction side is an SAM apparatus and SAM medium, but used as an SCMS medium by the manual switch, and where SCMS content is mounted thereon.

In this example, the SAM apparatus makes a copy to the apparatus used by the EMD medium in the EMD mode.

In this case, since the TOC information shows that the content is SCMS content, the processing is carried out as SCMS content.

When sending it, authentication is carried out between the SAM and SAM, the session key is formed, the SCMS content is encrypted by the session key and sent to the recording side, and the content unlocked by using the session key on the recording side.

Then, the recording side creates the content key, encrypts the content by this, and records the content on the medium.

Finally, the created content key is sent to the media SAM, and the session key is replaced by the storage key and stored.

Figure 38:
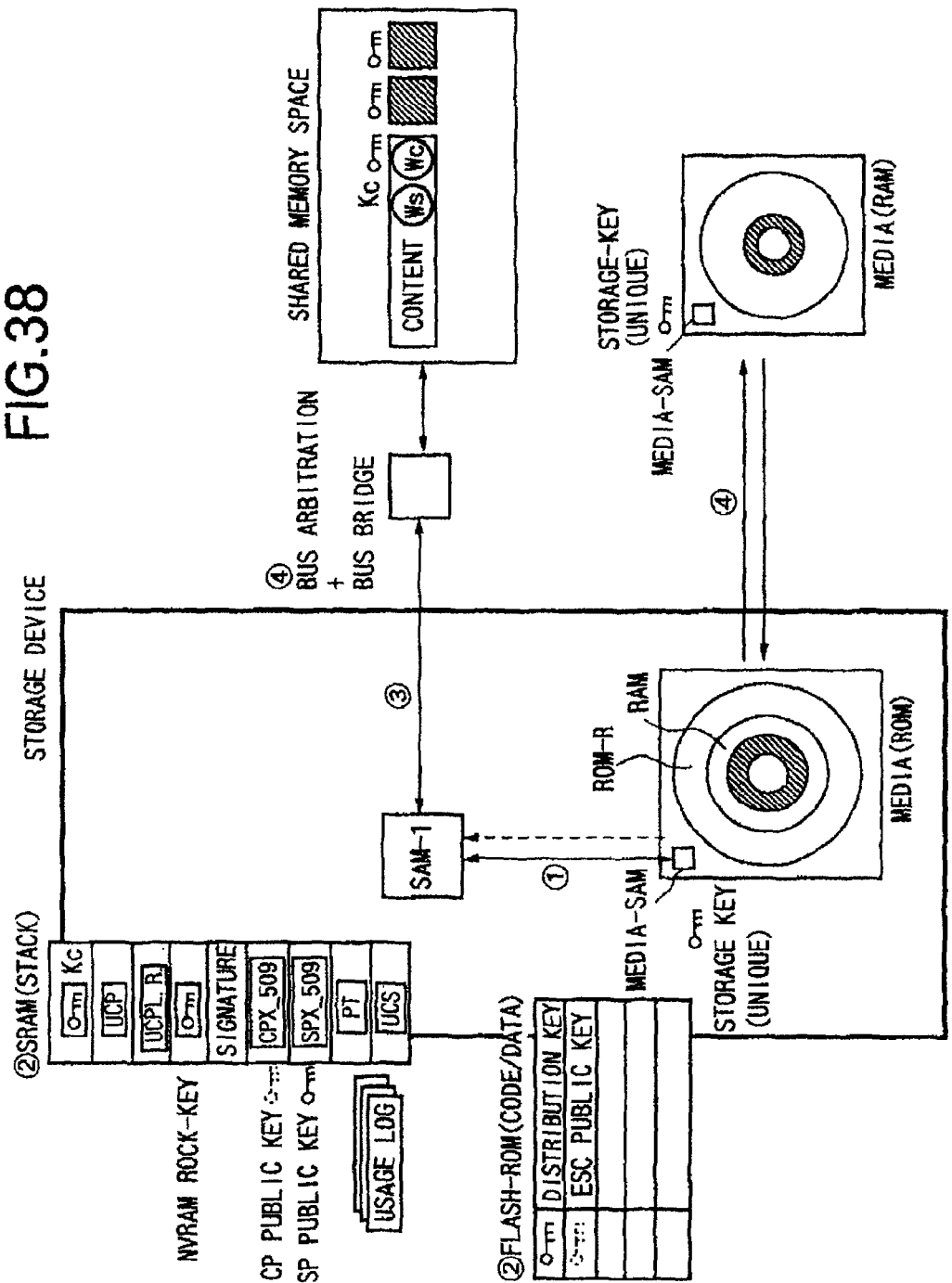
FIG. 38 is a view of a single drive copy.

FIG. 38 is a view of a single drive copy.

In this case, first, the ROM is entered, the key file is transferred to the SAM1, and the file system is opened. The content file is placed in the shared memory space.

Next, the ROM disk is removed. The RAM disk is then set.

Then, after determining the processing of the type of purchase by the SAM1, the determined key file (UCS key file) and the UCP key file of the product per se are recorded on the media SAM of the RAM.

Finally, the content is recorded in the RAM.

By doing this, two decks are not necessary. A copy can be made by a single deck.

Figure 39:
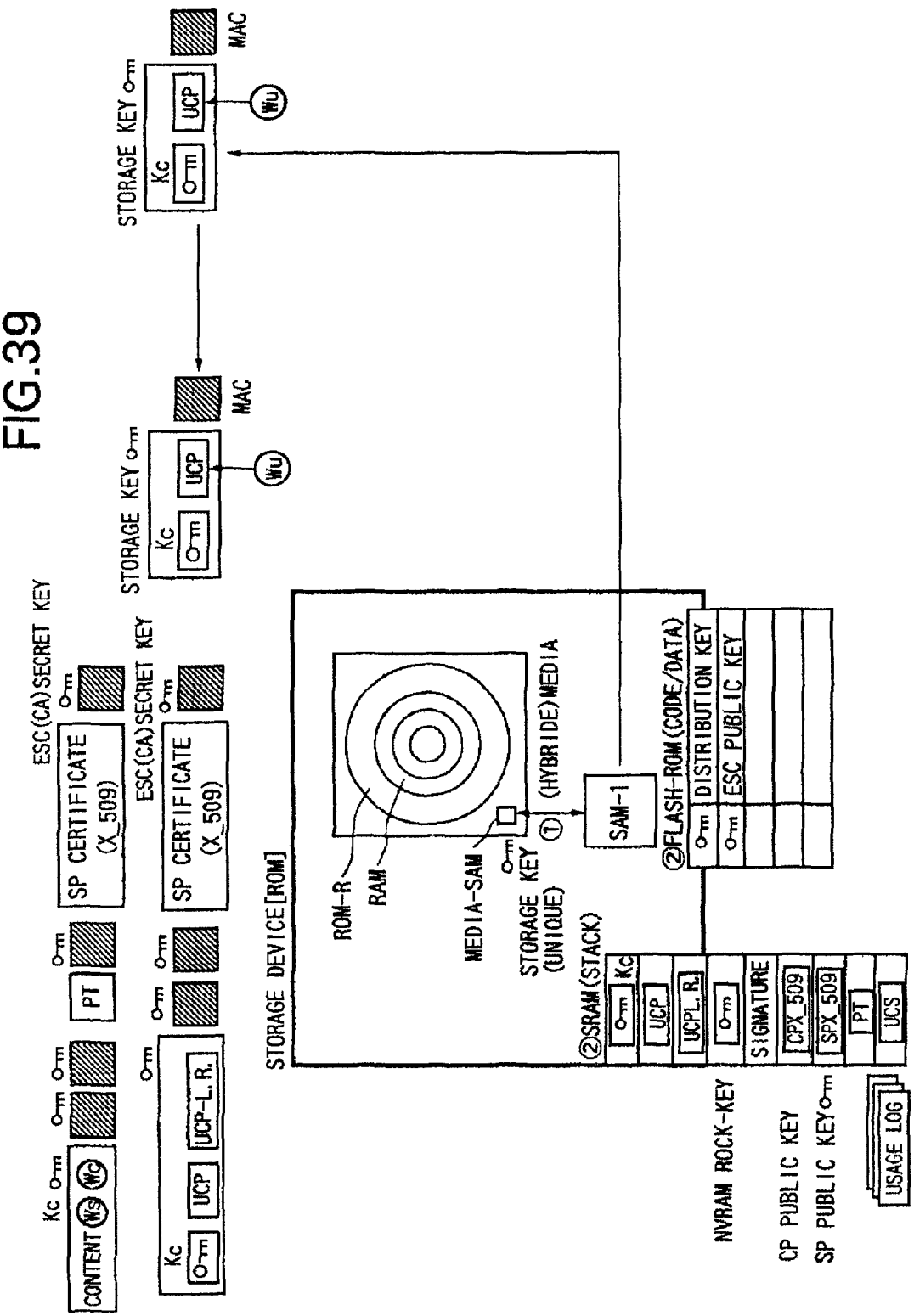
FIG. 39 is a view of a type of purchase by a ROM disk.

FIG. 39 is a view of a type of purchase by a ROM disk.

When buying a ROM, the type of purchase has not been determined. Also, a hybrid of a ROM-RAM becomes necessary.

In this case, all key files existing in the media SAM are transferred to the SAM1, listened to on a trial basis, and the content to be purchased selected. Then, the UCS key file is formed and recorded on the media SAM. By this, it becomes a ROM disk enabling only purchased music to be listened to.

In the case of RAMs, there are cases of only secure RAMs, cases of secure RAMs and media SAMs, and cases of no secure RAMs, and doing everything by media SAMs.

Summarizing the effects of the invention, in this way, according to the present invention, even in a system comprised of a variety of types of apparatuses connected together, the operating environment can be suitably grasped. Due to this, it is possible to provide a data distribution system and method capable of not only the suitable distribution of data, but also suitable processing such as control of copying of data, conversion of signals, charging, and distribution of profits, a data processing apparatus and method preferred when applied to such a data distribution system, and a data recording medium.

While the invention has been described with reference to specific embodiment chosen for purpose of illustration, it should be apparent that numerous modifications could be made thereto by those skilled in the art without departing from the basic concept and scope of the invention.

What is claimed is:

1. A data distribution system comprising:
   a reproducing apparatus for reproducing content data distributed from a first medium;
   a recording apparatus for recording the reproduced content data on a second medium;
   one or more processors for examining usage space information of the content data, the first medium, the reproducing apparatus, the second medium, and the recording apparatus; and
   a controller for controlling transfer of the content data from the first medium to the second medium based on the result of the examination;
   wherein the usage space information indicates system information of the recording apparatus and the reproducing apparatus, ownership right information of the content data, format information of the content data, and distributing profit information obtained by the distribution of the content data, and
   wherein the one or more processors:
   examines whether the content data is of a first type which is distributed in an encrypted state or of a second type which is distributed in an unencrypted state,
   examines whether the first medium is of a first type having a configuration enabling recorded data to be effectively read out by performing authentication processing or of a second type having no such configuration and enabling read out of the recorded data without authentication,
   examines the reproducing apparatus to determine whether the reproducing apparatus is of a first type for reproducing after the authentication processing or of a second type for reproducing without the processing, and
   examines the recording apparatus to determine whether the recording apparatus is of a first type for recording after the authentication processing or of a second type for recording without the processing.

2. A data distribution system as set forth in claim 1, wherein the controller disables the reproduction when the usage information indicates that the content data is of the first type, the first medium is the second type of medium, and the reproducing apparatus is the second type of reproducing apparatus.

3. A data distribution system as set forth in claim 1, wherein the controller disables the reproduction when that the content data is of the first type, the first medium is the second type of medium, and the reproducing apparatus is the first type of reproducing apparatus.

4. A data distribution system as set forth in claim 1, wherein the controller enables the reproduction when the usage information indicates that the content data is of the second type, the first medium is the second type of medium, and the reproducing apparatus is the second type of reproducing apparatus.

5. A data distribution system as set forth in claim 1, wherein the controller enables the reproduction when the usage information indicates that the content data is of the second type, the first medium is the second type of medium, and the reproducing apparatus is the first type of reproducing apparatus.

6. A data distribution system as set forth in claim 1, wherein the controller disables the reproduction when the usage information indicates that the content data is of the first type, the first medium is the first type of medium, and the reproducing apparatus is the second type of reproducing apparatus.

7. A data distribution system as set forth in claim 1, wherein the controller enables the reproduction when the usage information indicates that the content data is of the first type, the first medium is the first type of medium, and the reproducing apparatus is the first type of reproducing apparatus.

8. A data distribution system as set forth in claim 1, wherein the controller enables the reproduction when the usage information indicates that the content data is of the second type, the first medium is the first type of medium, and the reproducing apparatus is the second type of reproducing apparatus.

9. A data distribution system as set forth in claim 1, wherein the controller enables the reproduction when the usage information indicates that the content data is of the second type, the first medium is the first type of medium, and the reproducing apparatus is the first type of reproducing apparatus.

10. A data distribution system as set forth in claim 1, wherein the controller disables the recording when usage information indicates that the content data is of the first type, the second medium is the second type of medium, and the recording apparatus is the second type of recording apparatus.

11. A data distribution system as set forth in claim 1, wherein the controller disables the recording when usage information indicates that the content data is of the first type, the second medium is the second type of medium, and the recording apparatus is the first type of recording apparatus.

12. A data distribution system as set forth in claim 1, wherein the controller enables the recording when the usage information indicates that the content data is of the second type, the second medium is the second type of medium, and the recording apparatus is the second type of recording apparatus.

13. A data distribution system as set forth in claim 1, wherein the controller enables the recording when the usage information indicates that the content data is of the second type, the second medium is the second type of medium, and the recording apparatus is the first type of recording apparatus.

14. A data distribution system as set forth in claim 1, wherein the controller disables the recording when that the content data is of the first type, the second medium is the first type of medium, and the recording apparatus is the second type of recording apparatus.

15. A data distribution system as set forth in claim 1, wherein the controller enables the recording when the usage information indicates that the content data is of the first type, the second medium is the first type of medium, and the recording apparatus is the first type of recording apparatus.

16. A data distribution system as set forth in claim 1, wherein the controller enables the recording when the usage information indicates that the content data is of the second type, the second medium is the first type of medium, and the recording apparatus is the second type of recording apparatus.

17. A data distribution system as set forth in claim 1, wherein the controller enables the recording when the usage information indicates that the content data is of the second type, the second medium is the first type of medium, and the recording apparatus is the first type of recording apparatus.

18. A data processing apparatus comprising:
a reproducing apparatus for reproducing content data distributed from a recording medium;
one or more processors for examining usage space information of the content data, the recording medium, and the reproducing apparatus; and
a controller for controlling the reproduction of the content data from the recording medium based on results of the examination;
wherein the usage space information indicates system information of the reproducing apparatus, ownership right information of the content data, format information of the content data, and distributing profit information obtained by the distribution of the content data, and
wherein the one or more processors:
examines whether the content data is to of a first type which is distributed in an encrypted state or of a second type which is distributed in an unencrypted state,
examines whether the recording medium is of a first type having a configuration enabling recorded data to be effectively read out by performing authentication processing or of a second type having no such configuration and enabling read out of the recorded data without authentication, and
examines the reproducing apparatus to determine whether the reproducing apparatus is of a first type for reproducing after the authentication processing or of a second type for reproducing without the processing.

19. A data processing apparatus as set forth in claim 18, wherein the controller disables the reproduction when the usage information indicates that the content data is of the first type, the recording medium is the second type of recording medium, and the reproducing apparatus is the second type of reproducing apparatus.

20. A data processing apparatus as set forth in claim 18, wherein the controller disables the reproduction when the usage information indicates that the content data is of the first type, the recording medium is the second type of recording medium, and the reproducing apparatus is the first type of reproducing apparatus.

21. A data processing apparatus as set forth in claim 18, wherein the controller disables the reproduction when the usage information indicates that the content data is of the first type, the recording medium is the first type of recording medium, and the reproducing apparatus is the second type of reproducing apparatus.

* * * * *